United States Patent
Kimionis et al.

(10) Patent No.: US 12,228,631 B1
(45) Date of Patent: Feb. 18, 2025

(54) MULTISTATIC BACKSCATTER FOR JOINT COMMUNICATION AND RANGING

(71) Applicant: Nokia Solutions and Networks Oy, Espoo (FI)

(72) Inventors: Ioannis Kimionis, Murray Hill, NJ (US); Michael Eggleston, Columbus, OH (US); Eleftherios Kampianakis, Murray Hill, NJ (US); Traian Abrudan, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 18/791,959

(22) Filed: Aug. 1, 2024

(30) Foreign Application Priority Data

Aug. 9, 2023 (FI) ...................................... 20235886

(51) Int. Cl.
*G01S 13/00* (2006.01)
*G01S 13/36* (2006.01)

(52) U.S. Cl.
CPC ............ *G01S 13/003* (2013.01); *G01S 13/36* (2013.01)

(58) Field of Classification Search
CPC ........ G01S 13/003; G01S 13/24; G01S 13/26; G01S 13/36; G01S 13/38; G01S 13/75; G01S 13/751
See application file for complete search history.

(56) References Cited

U.S. PATENT DOCUMENTS

| | | | |
|---|---|---|---|
| 10,873,363 B2* | 12/2020 | Gollakota | H04B 1/713 |
| 2002/0015436 A1* | 2/2002 | Ovard | H04J 13/0022 375/130 |
| 2006/0220794 A1* | 10/2006 | Zhu | G06K 19/0723 340/10.4 |

(Continued)

FOREIGN PATENT DOCUMENTS

| | | |
|---|---|---|
| CN | 115616600 A | 1/2023 |
| WO | 2020/159714 A1 | 8/2020 |

(Continued)

OTHER PUBLICATIONS

Zhang et al., "Facilitating an Active Transmit-only RFID System Through Receiver-based Processing", 4th Annual IEEE Communications Society Conference on Sensor, Mesh and Ad Hoc Communications and Networks, Jun. 18-21, 2007, pp. 421-430.

(Continued)

*Primary Examiner* — Peter M Bythrow
(74) *Attorney, Agent, or Firm* — Nokia Technologies Oy

(57) ABSTRACT

A multistatic backscatter system may comprise unsynchronized devices. The unsynchronized device may comprise two or more spatially separated transmitter devices to transmit carrier signals, a transmitter device being configured to transmit carrier signals over a frequency set of two or more different frequencies; at least one backscatter device configured to frequency-shift the carrier signals, modulate data on at least some of the carrier signals, and backscatter modulated frequency-shifted carrier signals as backscatter signals, and at least one receiver device configured to receive the carrier signals and the backscatter signals, to process them to obtain the data and determine ranging information for the backscatter device.

16 Claims, 8 Drawing Sheets

(56) References Cited

U.S. PATENT DOCUMENTS

| | | | |
|---|---|---|---|
| 2008/0077015 A1* | 3/2008 | Boric-Lubecke | G01S 13/888 600/453 |
| 2008/0143584 A1 | 6/2008 | Shoarinejad et al. | |
| 2017/0180178 A1* | 6/2017 | Gollakota | H04K 3/25 |
| 2018/0375703 A1* | 12/2018 | Kellogg | H04L 27/34 |
| 2019/0158341 A1 | 5/2019 | Talla et al. | |
| 2019/0326970 A1 | 10/2019 | Ma et al. | |
| 2020/0212956 A1* | 7/2020 | Gollakota | H04B 1/40 |
| 2020/0284898 A1 | 9/2020 | Nanzer et al. | |
| 2020/0309938 A1 | 10/2020 | Oren et al. | |
| 2021/0396865 A1 | 12/2021 | Lockie et al. | |

FOREIGN PATENT DOCUMENTS

| | | |
|---|---|---|
| WO | 2022/199785 A1 | 9/2022 |
| WO | 2022/232668 A2 | 11/2022 |

OTHER PUBLICATIONS

Katanbaf et al., "MultiScatter: Multistatic Backscatter Networking for Battery-Free Sensors", Proceedings of the 19th ACM Conference on Embedded Networked Sensor Systems, Nov. 15-17, 2021, pp. 69-83.

Zou et al., "Tag Read Enhancement Using Unsynchronized Signal from Adjacent Readers in Multi-Cell RFID System", IEEE RFID Technology and Applications Conference (RFID-TA), Sep. 8-9, 2014, pp. 62-67.

Kimionis et al., "Increased Range Bistatic Scatter Radio", IEEE Transactions on Communications, vol. 62, No. 03, Mar. 2014, pp. 1091-1104.

Nikitin et al., "UHF RFID Tag Characterization: Overview and State-of-the-art", Antenna Measurement Techniques Association Symposium, Oct. 21-26, 2012, 6 pages.

Qi et al., "Breaking the Range Limit of RFID Localization: Phase-based Positioning with Tunneling Tags", IEEE International Conference on RFID (RFID), Apr. 2-4, 2019, 8 pages.

Noroozi et al., "Target Localization from Bistatic Range Measurements in Multi-Transmitter Multi-Receiver Passive Radar", IEEE Signal Processing Letters, vol. 22, No. 12, Dec. 2015, pp. 2445-2449.

"EPC™ Radio-Frequency Identity Protocols Class-1 Generation-2 UHF RFID Protocol for Communications at 860 MHZ-960 MHz", EPC Global, V1.2.0, Oct. 23, 2008, pp. 1-108.

Amiri et al., "Exact Solution for Elliptic Localization in Distributed MIMO Radar Systems", IEEE Transactions on Vehicular Technology, vol. 67, No. 02, Feb. 2018, pp. 1075-1086.

"IEEE 802.11", Wikipedia, Retrieved on Jun. 7, 2024, Webpage available at : https://en.wikipedia.org/wiki/IEEE_802.11.

"IEEE 802.15", Wikipedia, Retrieved on Jun. 7, 2024, Webpage available at : https://en.wikipedia.org/wiki/IEEE_802.15.

Office action received for corresponding Finnish Patent Application No. 20235886, dated Dec. 19, 2023, 13 pages.

Huynh et al., "Ambient Backscatter Communications: A Contemporary Survey", IEEE Communications Surveys & Tutorials, vol. 20, No. 04, Fourthquarter, 2018, pp. 2889-2922.

Rezaei et al., "Large-Scale Wireless-Powered Networks With Backscatter Communications—A Comprehensive Survey", IEEE Open Journal of the Communications Society, vol. 01, Jul. 28, 2020, pp. 1100-1130.

Office action received for corresponding Finnish Patent Application No. 20235886, dated May 3, 2024, 5 pages.

Extended European Search Report received for corresponding European Patent Application No. 24182524.9, dated Dec. 13, 2024, 8 pages.

* cited by examiner

MULTISTATIC BACKSCATTER FOR JOINT COMMUNICATION AND RANGING

RELATED APPLICATION

This application claims benefit of priority from Finnish Patent App. No. 20235886, filed Aug. 9, 2023, the disclosure of which is hereby incorporated in its entirety by reference herein.

TECHNICAL FIELD

Various example embodiments relate to communication systems.

BACKGROUND

Communication systems are under constant development. The 5G, 5G-Advanced, and beyond future wireless networks, or network generations, aim to support a large variety of services, use cases and industrial verticals. Backscatter communication, which is based on passive reflection and modulation of incident signals, provides a prominent technology for some use cases, for example for use cases involving a large number of sensors. Enhancements, for example enhancements easing synchronization requirements, are desired.

SUMMARY

The independent claims define the scope, and different embodiments are defined in dependent claims.

According to an aspect there is provided a multistatic backscatter system comprising at least one transmitter device to transmit carrier signals over a frequency set of two or more different frequencies; at least one backscatter device configured to frequency-shift the carrier signals, modulate data on at least some of the carrier signals, and backscatter modulated frequency-shifted carrier signals as backscatter signals; and at least one receiver device configured at least to receive the carrier signals and the backscatter signals, split the signals received at least to a first sub-signal and a second sub-signal, sub-channelize at least the first and second sub-signals to two or more carrier sub-channels and two or more back-scatter sub-channels to obtain at least one set of two pairs comprising a pair of carrier sub-channels and a pair of corresponding backscatter sub-channels, determine, per a set of two pairs, an occurrence time interval of an occurrence of a backscatter signal in a backscatter sub-channel, demodulate the backscatter sub-channel during the occurrence time interval to obtain the data, determine from the data at least identifier of a backscatter device, and determine, based at least on the occurrence time interval, ranging information for the backscatter device, wherein the at least one transmitter device, the at least one backscatter device and the at least one receiver device are unsynchronized.

According to an aspect there is provided a receiver device comprising at least one processor and at least one memory storing instructions that, when executed by the at least one processor, cause the receiver device at least to: receive signals comprising at least carrier signals and corresponding backscatter signals, which are frequency-shifted, modulated backscattered carrier signals; split the signals received at least to a first sub-signal and a second sub-signal; sub-channelize at least the first and second sub-signals to two or more carrier sub-channels and two or more back-scatter sub-channels to obtain at least one set of two pairs comprising a pair of carrier sub-channels and a pair of corresponding backscatter sub-channels; determine, per a set of pairs, an occurrence time interval of an occurrence of backscatter signal in a backscatter sub-channel; demodulate the backscatter sub-channel during the occurrence time interval to obtain data modulated to a backscatter signal; determine from the data obtained by demodulating at least an identifier of a backscatter device; and determine, during the occurrence time interval, ranging information for the backscatter device.

According to an aspect there is provided a backscatter device, which is a receiverless, unsynchronized device comprising at least one processor and at least one memory storing instructions that, when executed by the at least one processor, cause the backscatter device at least to: be in an idle state during a first period; and frequency-shift carrier signals, modulate data on at least some of the carrier signals, and backscatter modulated frequency-shifted carrier signals as backscatter signal during a second period, wherein the first period and the second period are alternating, the length of the first period varying randomly.

According to an aspect there is provided a transmitter device comprising at least one processor and at least one memory storing instructions that, when executed by the at least one processor, cause the transmitter device at least to: generate at least first signals having a first frequency and second signals having a second frequency; combine at least the first signals and the second signals to multifrequency carrier signals; and transmit the multi-frequency carrier signals towards at least one receiver device and at least one backscatter device without synchronizing with the at least one receiver device and the at least one backscatter device.

According to an aspect there is provided a method comprising at least: receiving signals comprising at least carrier signals and corresponding backscatter signals, which are frequency-shifted, modulated backscattered carrier signals; splitting the signals received at least to a first sub-signal and a second sub-signal; sub-channelizing at least the first and second sub-signals to two or more carrier sub-channels and two or more back-scatter sub-channels to obtain at least one set of two pairs comprising a pair of carrier sub-channels and a pair of corresponding backscatter sub-channels; determining, per a set of pairs, an occurrence time interval of an occurrence of backscatter signal in a backscatter sub-channel; demodulating the backscatter sub-channel during the occurrence time interval to obtain data modulated to a backscatter signal; determining from the data obtained by demodulating at least an identifier of a backscatter device; and determining, during the occurrence time interval, ranging information for the backscatter device.

According to an aspect there is provided a computer readable medium comprising instructions stored thereon for performing at least the following: receiving signals comprising at least carrier signals and corresponding backscatter signals, which are frequency-shifted, modulated backscattered carrier signals; splitting the signals received at least to a first sub-signal and a second sub-signal; sub-channelizing at least the first and second sub-signals to two or more carrier sub-channels and two or more back-scatter sub-channels to obtain at least one set of two pairs comprising a pair of carrier sub-channels and a pair of corresponding backscatter sub-channels; determining, per a set of pairs, an occurrence time interval of an occurrence of backscatter signal in a backscatter sub-channel; demodulating the backscatter sub-channel during the occurrence time interval to obtain data modulated to a backscatter signal; determining from the data obtained by demodulating at least an identifier of a backscatter device; and determining, during the occurrence time interval, ranging information for the backscatter device.

According to an aspect there is provided a computer program comprising instructions which, when executed by an apparatus, cause the apparatus to perform at least the following: receiving signals comprising at least carrier signals and corresponding backscatter signals, which are frequency-shifted, modulated backscattered carrier signals; splitting the signals received at least to a first sub-signal and a second sub-signal; sub-channelizing at least the first and second sub-signals to two or more carrier sub-channels and two or more back-scatter sub-channels to obtain at least one set of two pairs comprising a pair of carrier sub-channels and a pair of corresponding backscatter sub-channels; determining, per a set of pairs, an occurrence time interval of an occurrence of backscatter signal in a backscatter sub-channel; demodulating the backscatter sub-channel during the occurrence time interval to obtain data modulated to a backscatter signal; determining from the data obtained by demodulating at least an identifier of a backscatter device; and determining, during the occurrence time interval, ranging information for the backscatter device.

BRIEF DESCRIPTION OF DRAWINGS

Embodiments are described herein, by way of example only, with reference to the accompanying drawings, in which.

DETAILED DESCRIPTION OF SOME EMBODIMENTS

Emerging industrial applications include, for example, asset tracking, machine navigation, and creating a digital twin of the industrial scenario, where all physical assets of interest can be handled virtually. In all those scenarios, specific data are being communicated from an extremely large number of physical objects. Collected data may be, for example, the geographic information of the underlying objects (position, orientation, velocity, etc.), environmental data collected by its sensors (temperature, humidity, etc.), or simply object identifiers, e.g. serial numbers. It is envisaged that backscatter communication can be used, for example, for the above user cases. To overcome small range limitations of a monostatic backscatter system, a multistatic backscatter systems that do not require transmission/reception synchronization and enable joint ranging information and data reception over backscatter signals are disclosed.

Figure 1:
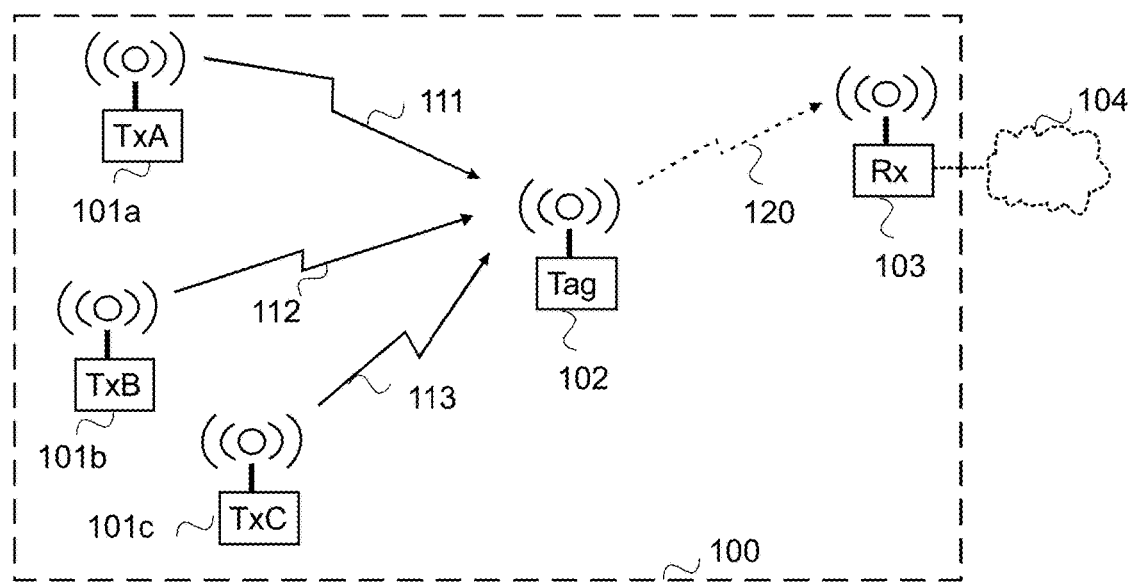
FIG. 1 illustrates an exemplified high-level system architecture.
Figure 2:
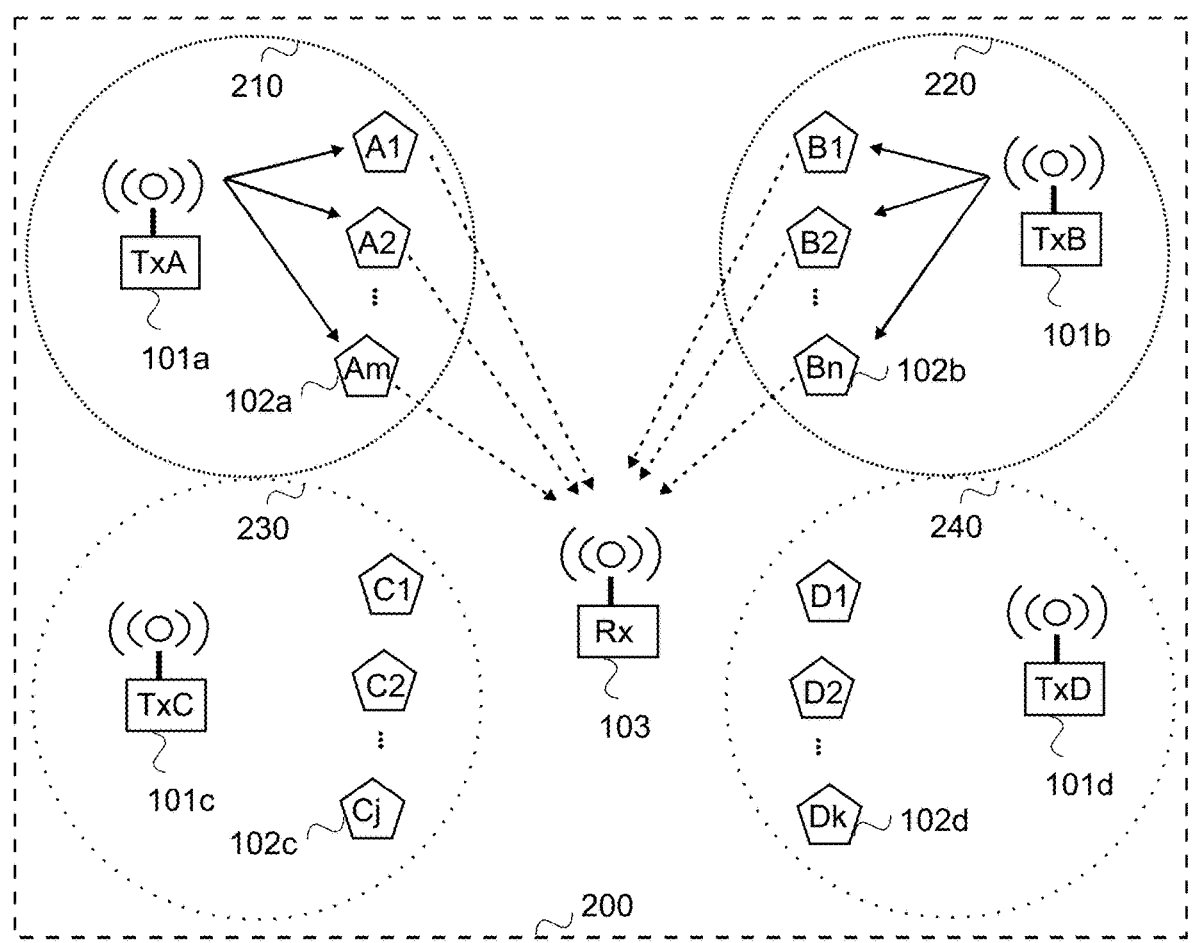
FIG. 2 illustrates another exemplified high-level system architecture.

FIG. 1 and FIG. 2 illustrate basic concepts for a multistatic backscatter system in which there is a physical separation between a transmitter device and a receiver device which allow scalability, coverage of larger areas without need for synchronization between the transmitter device and the receiver device, for example, and without need for downlink communication between the transmitter device and a backscatter device. In other words, the transmitter devices, the backscatter device(s) and receiver device(s) may be unsynchronized. For example, they do not need share a timing source, or an oscillator. Hence, deployment constraints can be relaxed, for example in challenging environments, e.g. when routing low-latency backbone wired connectivity is impractical. Further, it should be appreciated that even though in the examples it is assumed that there are two or more transmitter devices per a receiver device, the examples can be applied to any combination of M transmitter devices for N receiver devices, including a bistatic deployment scenario having one transmitter device per a receiver device.

FIG. 1 and FIG. 2 illustrate exemplified extremely high-level network architectures only showing some functional entities, all being logical units, whose implementation may differ from what is shown. The connections shown in FIG. 1 and FIG. 2 are logical connections; the actual physical connections may be different.

Referring to FIG. 1, a multistatic backscatter system 100 comprises two or more transmitter devices 101a, 101b, 101c, at least one backscatter device 102 and at least one receiver device 103. The backscatter system 100 may be a front end to a wireless communication system 104 or to a cloud based data processing system 104, or a cloud platform, for example via at least one of the at least one receiver device 103.

In the example of FIG. 1, the transmitter devices 101a, 101b, 101c are spatially separated transmitter devices to transmit carrier signals over a frequency comb, as will be described in detail with reference to FIG. 3, at least for illuminating backscatter device(s) within range. More precisely, a transmitter device is configured to transmit carrier signals over a frequency set of two or more different frequencies or carrier tones at least for illuminating purposes. The transmitter device may also be called an illuminator. In the illustrated example of FIG. 1, a transmitter device TxA 101a may be configured to transmit carrier signals 111 over a first frequency set of frequencies F1 and F2, a transmitter device TxB 101b may be configured to transmit carrier signals over a second frequency set 112 of frequencies F3 and F4 and a transmitter device TxC 101*c* may be configured to transmit over a third frequency set 113 of frequencies F5 and F6. The set of frequencies may be preset, for example preconfigured, to a corresponding transmitter device.

The backscatter device 102, called also a tag, is configured to frequency shift the carrier signals 111, 112, 113, modulate data, for example data packets, to at least some of the carrier signals, as described in detail in the present disclosure, and to backscatter modulated, frequency-shifted carrier signals as backscatter signals 120. (A backscatter signal is a frequency shifted and modulated reflection of a carrier signal.) The backscatter device 102 may be configured to backscatter data in random intervals. An advantage of that is that then the backscatter device does not need an on-device receiver for downlink communication with the transmitter device(s) to agree on timing of data communication. In other words, the backscatter device may be a receiverless device. The backscatter device 102 is agnostic to the frequencies of the carrier signals 111, 112, 113 transmitted by the transmitter devices 101*a*, 101*b*, 101*c*. An advantage of the fact that the backscatter device 102 will backscatter at any frequency that is illuminating it is that in complicated environments with heavy blockages and multipath, potential spatial and frequency diversity may be achieved. The backscatter device may or may not be configured to harvest energy from the carrier signals.

The receiver device 103, called also a reader, or an apparatus comprising the receiver device, is configured to receive at least the backscatter signals 120 and carrier signals, and to perform joint ranging information and data reception from the at least one backscatter device, as described in detail in the present disclosure, without being synchronized with the transmitter devices 101*a*, 101*b*, 101*c* and/or with the at least one backscatter device 102. It should be appreciated that, even though not illustrated in FIG. 1, there is a direct propagation path between any of the transmitter devices and the receiver device 103. The receiver device may be provided with information on transmitter devices and their frequency sets. Such information may be stored to a memory of the receiver device, and/or to a memory, or memories in the multistatic backscatter system 100 and/or in the cloud platform.

The wireless communication system 104 and/or the cloud platform may use any technology that enable implementations of the one or more uses cases the backscatter devices, or the transmitter devices, provide data and ranging information. For example, the wireless communication system 104 may be a wireless network that may comprise an access network and/or a core network and/or a data network. An example of a wireless communication system is described herein with reference to at least FIG. 19. The access network may be based on any kind of an access network, such as a cellular access network, for example 5G network, 5G-Advanced network, 6G network, 7G network, etc., a non-terrestrial network, a legacy cellular radio access network, for example 4G or older generation network, or a non-cellular access network, for example a wireless local area network, or any combination thereof. The core network may be based on a non-standalone core network, for example an LTE-based network, or a standalone access network, for example a 5G core network. The data network may be any network, like the internet, an intranet, a wide area network, etc. Different remote monitoring and/or data collection services for different use cases may be reached via the data network, and the data network may provide the cloud platform.

FIG. 2 illustrates another example of a multistatic system with at least one receiver device, a plurality of receiverless backscatter devices, and a plurality of transmitter devices. The transmitter devices, the backscatter devices and the receiver device may correspond to devices described above with reference to FIG. 1. The multistatic system disclosed in FIG. 2 provides a multiple access scheme. In the multiple access scheme two or more transmitter devices may be configured to transmit carrier signals over an overlapping set of frequencies at time intervals that are not overlapping.

Referring to FIG. 2, in the illustrated example system 200 at a specific time t, a transmitter device TxA 101*a* transmits carrier signals, depicted by arrow head solid lines, backscattered, depicted by arrow head dashed lines, within an area 210 by a plurality of backscatter devices 102*a*, denoted by A1 to Am, that locate in a proximity of the transmitter device. The area 210 may be an area within which the transmitter device can provide sufficient carrier power for tag decoding, i.e. for backscatter signals the receiver device is able to decode. The sufficient carrier power may be given as a signal to noise ratio, SNR, requirement at the receiver device. The area 210 may be called a cell. Correspondingly, at the specific time t, a transmitter device TxB 101*b* transmits carrier signals, depicted by arrow head solid lines, backscattered, depicted by arrow head dashed lines, within an area 220 (cell 220) by a plurality of backscatter devices 102*b*, denoted by B1 to Bn. In the illustrated example of FIG. 2, at the specific time t, a transmitter device TxC 101*c* and a transmitter device TxD 101*d* are not transmitting. However, the transmitter device TxC 101*c* may later transmit carrier signals, within an area 230 (cell 230) in which a plurality of backscatter devices 102*c*, denoted by C1 to Cj, locate, and correspondingly, the transmitter device TxD 101*d* may later transmit carrier signals, within an area 240 (cell 240) in which a plurality of backscatter devices 102*d*, denoted by D1 to Dk, locate, while the transmitter devices TxA and TxB are not transmitting. The transmitter devices may be preconfigured with transmission time intervals.

Even though not illustrated in FIG. 2, the areas 210, 220, 230, 240 may overlap with each other, be of any shape, and/or one backscatter device may backscatter carrier signals from two or more transmitter devices. For example, carrier frequencies from the transmitter device TxA 101*a* may illuminate also backscatter devices B1 to Bn, C1 to Cj, D1 and Dk, which then backscatter corresponding frequency-shifted modulated backscatter signals. In another example, a backscatter device depicted as a separate device in FIG. 2 may be one backscatter device. For example, a backscatter device may be depicted as A1, Bn and C2 in the illustrated example of FIG. 2. Further, as described with reference to at least FIG. 1, the backscatter device does not choose a carrier frequency and thus modulate packets on all carrier frequencies that illuminate the backscatter device. However, the backscatter device may present higher SNR value, or backscattering, around the frequencies of their closest transmitter device, unless there are path blockages and/or multipath dictate otherwise. Backscattering in other frequencies, i.e. around the frequencies of other transmitter devices that are not so close, may present a lower SNR value, when there are no path blockages and/or multipath does not dictate otherwise.

The illustrated system 200 of FIG. 2 further comprises a receiver device 103 that is located arbitrarily in the environment in a location in which the receiver device 103 may receive backscatter signals from the backscatter devices 102*a*, 102*b*, 102*c*, 102*d* with different SNR values, the backscatter signals being derived from illuminating signals originating from the illustrated transmitters devices 101*a*, 101*b*, 101*c*, 101*d*. The receiver device 103 may treat received backscatter signals based on their SNR values, for example a signal with a low SNR value as interference or noise, and a signal with a high, or high enough SNR value, as carrying data. Usually, as described above, scattered signal, which is based on a carrier signal from the closest transmitter device, has the highest SNR value. However, the receiver device 103 is not aware of the closest transmitter device, but may decode data from a transmitter device that is not the closest one. For example, assuming that there occurs path blockage between the backscatter device B1 and the nearest transmitter device TxB 101*b*, meaning that the backscatter device B1 belongs to cell 220, the backscatter SNR value from the backscatter device B1 at frequencies F3/F4 will be low, but if a path between the transmitter device TxA 101*a* and the backscatter device B1 allows for higher SNR value at the receiver device 103, the backscatter signal from the backscatter device B1 will be decoded by the receiver device 103 at frequencies F1/F2, as if the backscatter device B1 would belong to cell 210 instead of the cell 220. In other words, data from the backscatter device will be received. Hence, spatial and frequency diversity may be achieved.

Even though in the above examples only one receiver device has been depicted, it is a straightforward process for one skilled in the art to implement the solutions to backscatter systems comprising more than one receiver device.

Figure 3:
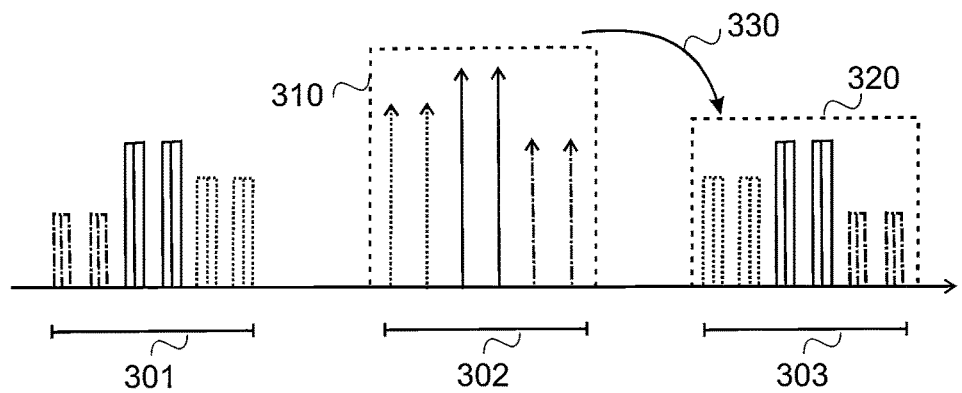
FIG. 3 illustrates an example of a frequency spectrum.

FIG. 3 illustrates an example of a spectrum and its spanning. The example of FIG. 3 is based on the example illustrated in FIG. 1, assuming that there is a transmitter device using a set of frequencies of F1 and F2, depicted by dashed lines in FIG. 3, a transmitter device TxB using a set of frequencies F3 and F4, depicted by solid lines in FIG. 3, and a transmitter device using a set of frequencies F5 and F6, depicted by dash-dot lines in FIG. 3.

Referring to FIG. 3, the carrier channel 310 comprises carrier signals having carrier frequencies F1, F2, F3, F4, F5, F6. In other words, a combined spectrum of the transmitter devices is a frequency comb, i.e. the carrier channel 310. The backscatter device, which is agnostic to the frequencies, frequency shifts, depicted by arrow 330 in FIG. 3, all the carrier frequencies, or carrier signals, illuminating the backscatter device. Hence, there are replicas of a baseband signal of the backscatter device, the replicas forming a backscatter channel 320, or a backscatter radio frequency channel. The backscatter channel 320 forms a multi-frequency spectrum. Even though the replicas may carry the same data, every replica has a unique path-dependent phase associated with it, the path-dependent phase depending on the frequency and a signal travel distance, i.e. a distance between the backscatter device and a corresponding transmitter device. The frequency shifting may be performed on both sides of the carrier frequencies, 302 denoting frequencies of illuminating carries, 301 denoting a lower backscatter response and 303 denoting an upper backscatter response. Hence, a receiver bandwidth, which corresponds to the solid line and dash-dot line rectangles, spans over several frequencies, or tones.

Figure 4:
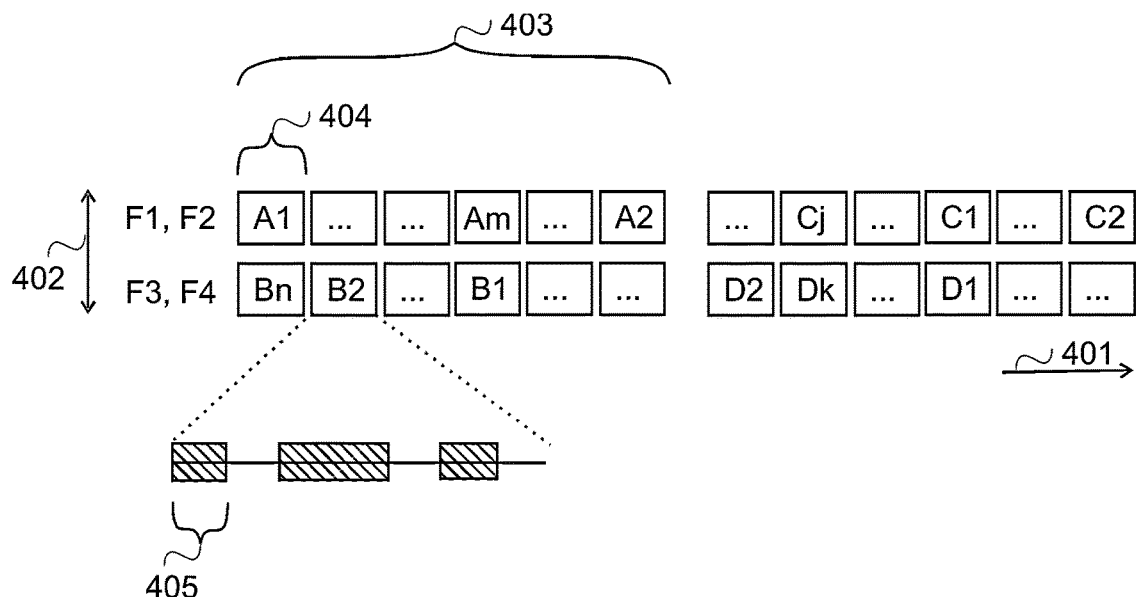
FIG. 4 illustrates an example of a multistatic multiple access scheme.

FIG. 4 illustrates a simplified example of a multistatic multiple access scheme implementing multiplexing. The example of FIG. 4 is based on the example illustrated in FIG. 2. In the illustrated example, transmissions from the backscatter devices, as received by the receiver device, over time 401 and frequency 402 are illustrated. In the example of FIG. 4, it is assumed that the transmitter devices TxA and TxB transmit at the same time during a predetermined transmission time, and when they transmit, the transmitter devices TxC and TxD are not transmitting, and vice versa, i.e. when transmitter devices TxC and TxD are transmitting during the predetermined transmission time, the transmitter devices TxA and TxB are not transmitting. Further, it is assumed that the transmitter device TxA and the transmitter device TxC use a frequency set of frequencies F1 and F2, and the transmitter device TxB and the transmitter device TxD use a frequency set of frequencies F3 and F4. Still another assumption is that a backscatter device transmits one short packet within a long interval window, for example 0.1% to 1% packet duration vs interval window ratio, in random intervals.

Referring to FIG. 4, during an inventory cycle 403, corresponding in the illustrated example to the predetermined transmitting time, which may be 2 seconds, 1000 packets may be transmitted, when a packet 404 has a packet duration of 2 milliseconds, and may contain 200 on-off-keying symbols, a duration, or a period, of a symbol 405 being 10 microseconds, the different on-off-keying symbols having the same duration.

As described above, the receiver device receives the packets in two dimensions: time 401 and frequency 402, as illustrated in FIG. 4. Since in the time dimension, the backscatter devices in the example of FIG. 4, transmit their packets at a random time interval, for a given frequency, tag collisions can be avoided in the time domain. At each time slot, the receiver device may be statistically subject to tag collisions (backscatter device collisions) and then the frequency dimension of the multiple access scheme aids the multiplexing efficiency. Assigning different frequencies to different transmitter devices, or illuminators, for example the transmitter device TxA uses carrier frequencies F1, F2, while the transmitter device TxB uses F3, F4, allows frequency multiplexing at a given time slot. Furthermore, the transmitter devices can re-use frequencies. As an example, based on FIG. 2, the transmitter device TxC may use the same frequencies (same set of frequencies) as the transmitter device TxA, at different time instances, e.g. inventory cycles, and therefore no collisions occur. Since the backscatter devices are agnostic of the carrier frequency that is illuminating them, the receiver device is performing wideband reception, as explained with reference to FIG. 3, and may process all backscatter packets received over the backscatter channel.

As can be seen from the above examples, the multistatic backscatter system can be implemented without frequency synchronization requirements between the transmitter devices and the receiver device(s) and without downlink communication requirements from the backscatter device(s) to the transmitter devices. These increase scalability. Further, backscatter tag communication range can be maximized, since there is no SNR constraint for decoding commands, or other transmissions from a transmitter device to the backscatter device.

Figure 5:
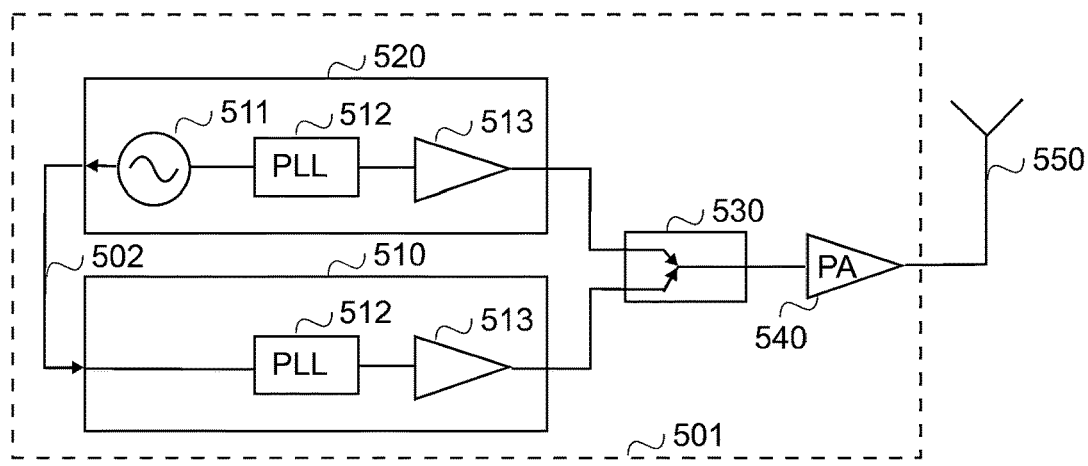
FIG. 5 is a schematic block diagram of an example of a transmitter device.

FIG. 5 is a schematic block diagram of an example circuitry arrangement of a transmitter device. The transmitter device may be any electronic device configurable to transmit at least carrier signals. The example in FIG. 5 represents a two-carrier signal transmitter device, which may be called a two-tone illuminator. It is a straightforward task for a person skilled in the art to implement the example to a transmitter device, e.g. a multi-tone illuminator, transmitting a multiple (more than two) carrier signals. A non-limiting list of transmitter devices comprises routers, integrated access and backhaul (IAB) nodes, smart phones and WLAN hot spots. A transmitter device may be a non-mobile device with a fixed, known location, or a mobile device whose location the receiver device, or the cloud platform, for example, knows at a time carrier signals are transmitted.

Referring to FIG. 5, the transmitter device 501 comprises a first signal generator 510 for generating (outputting) signals having a first frequency, and a second signal generator 520 for generating signals having a second frequency. The first signal generator 510 comprises a phase locked loop, PLL, 512, or a corresponding oscillator circuit, and an amplifier 513, for example a variable gain amplifier. The second signal generator 510 comprises an internal reference oscillator 511, a phase locked loop, PLL, 512, or a corresponding oscillator circuit, and an amplifier 513, for example a variable gain amplifier. The internal reference oscillator 511 may be a 10 MHz internal reference oscillator. The output of the internal reference oscillator 511 is fed to the phase locked loop 512, so that the output signal from the first signal generator 510 is phase-locked with the output signal from the second signal generator 520. The output signals of the signal generators produce carrier signals with a frequency gap, for example 1 MHz frequency gap. In the example of FIG. 5, the transmitter device 510 further comprise a combiner 530, for example a power combiner or a digital combiner, which combines the signals, i.e. outputs from the signal generators, to a carrier signal, and a power amplifier PA 540, which amplifies the combined carrier signal before two-frequency carrier signal is transmitted via an antenna 550 for illuminating backscatter devices, for example.

As described above, FIG. 5 illustrates one example. It should be appreciated that other techniques to generate multi-frequency carrier signals may be used. For example, direct digital synthesis may be used.

Figure 6:
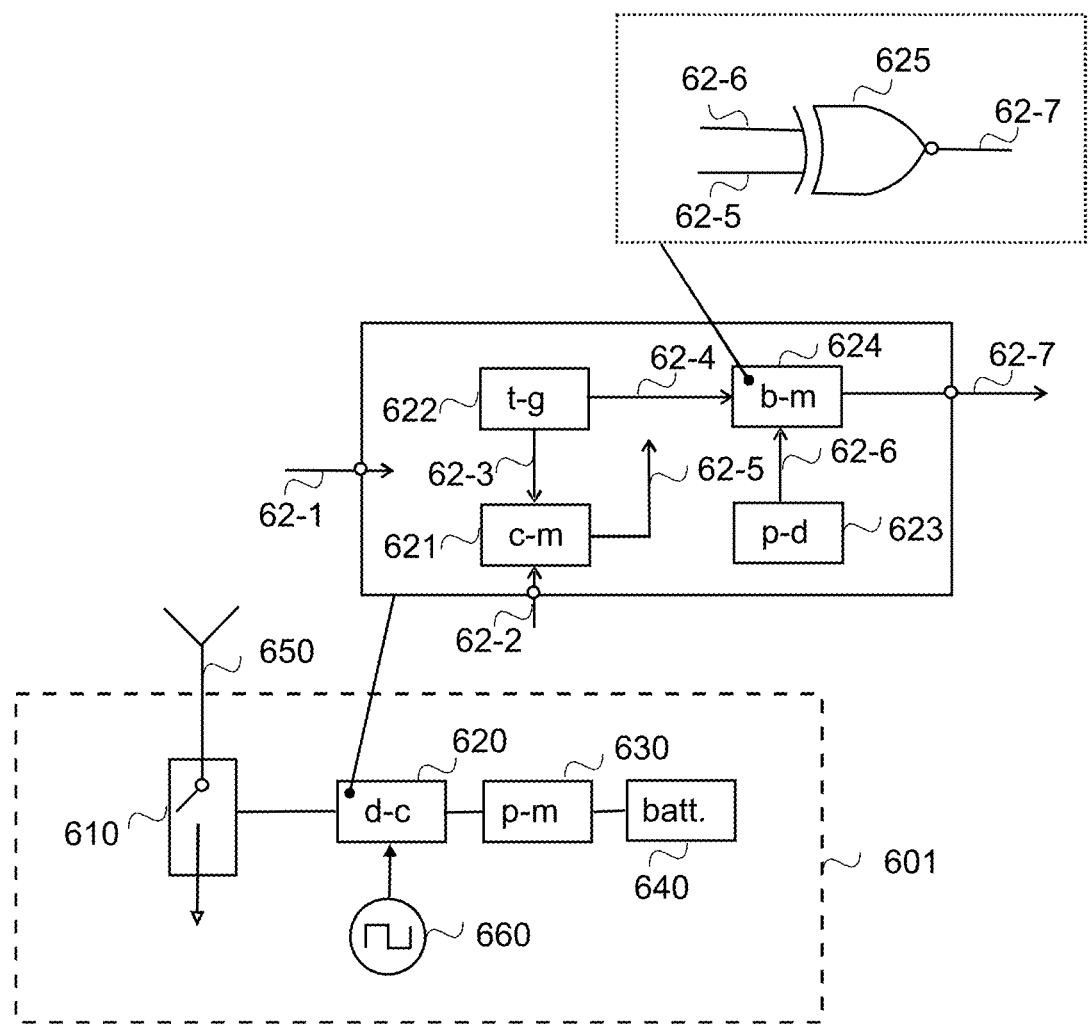
FIG. 6 is a schematic block diagram of an example of a backscatter device.

FIG. 6 is a schematic block diagram of an example circuitry arrangement of a backscatter device that requires little power and has a small form factor. The backscatter device may be any electronic device configurable to at least transmit data by backscattering modulated frequency shifted carrier signals. A non-limiting list of backscatter devices include different asset identification tags, a device operating in an industrial and/or an automated processing chain context, different sensors, like pressure sensors, humidity sensors, industrial wireless sensors, thermometers, motion sensors, actuators, accelerometers, etc., surveillance cameras, wearable devices, such as helmets, industrial internet of things devices, automated guided vehicles, a mobile robot, etc.

Referring to FIG. 6, the backscatter device 601 comprises at least a radio frequency switch 610, a digital controller (d-c) 620, a power manager (p-m) 630, a battery (batt.) 640, an antenna 650 and an oscillator 660, for example a high-frequency oscillator.

The radio frequency switch 610 is used to modulate the phase and amplitude of the carrier signals that are incident to the antenna 650 by terminating the antenna 650 with two distinct impedance loads, for example open and short, and, thus, backscatter the frequency-shifted data that are generated by the digital controller 620. The radio frequency switch 610 may be called a radio frequency switch modulator. The digital controller 620 controls generation of backscatter signals, as described in detail in the present disclosure. In the illustrated example, the backscatter device 601 is a battery powered device that may, or may not, be configured to harvest energy to charge the batteries. The battery 640 is connected to the power manager 630. The power manager 630 generates appropriate voltages to power the radio frequency switch 610, the oscillator 660, and the digital controller 620. The digital controller 620 uses the oscillator 660 in frequency shifting.

The digital controller 620 may be a low-power field programmable gate array, FPGA, a microcontroller unit, MCU, or an application specific integrated circuit, ASIC. The digital controller 620 may comprise, as illustrated in FIG. 6, in a top level at least following sub-units: a clock manager (c-m) 621, a trigger generator (t-g) 622, a data memory (p-d) 623, for example a buffer or other packet data memory, and a backscatter modulator (b-m) 624. The backscatter modulator 624 is responsible for frequency shifting and transmitting (reflecting) the backscatter signal. The inputs to the digital control module comprise at least a reset signal 62-1 and a clock signal 62-2, for example a high-frequency clock signal. The reset signal 62-1 initializes the clock manager 621, the trigger generator 622, the buffer 623, and the backscatter modulator 624, and it may, or may not, initialize the radio frequency switch 610 and/or the power manager 630. The clock signal 62-2 provides an external clock to the clock manager 621 to generate master clock signals 62-5 that may be utilized as a symbol/bit clock during packet transmission and for frequency up conversion. The digital controller outputs data signal 62-7 that controls the radio frequency switch 610, which in turn is used to reflect the incident signals.

The trigger generator 622 may utilize a linear feedback shift register to generate a trigger signal 62-4 with a random interval, for example to implement the receiverless multiple access method illustrated and described for example with reference to FIG. 4, and a clock selection signal 62-3. The trigger signal 62-4 initiates a packet transmission that is handled by the backscatter modulator 624. The backscatter modulator 624 receives the data 62-6, or data packets, stored in the data memory 623, for example in the buffer, and modulates the packets, for example by using frequency-shifted binary phase shift keying modulation, to output data 62-7.

The clock manager 621 may alternate the master clock between a low power clock, for example an internal 10 kHz radio-controlled clock in the FPGA or the MCU, and an external clock (external clock to the digital controller 620), the external clock being generated by the oscillator 660, for example. The low power clock may be used when the backscatter device is idle, e.g. in a sleep state and not transmitting, i.e. modulating packets, and the external clock may be is used when the backscatter device is transmitting a packet. By selecting long idle intervals an average energy consumption per a packet is reduced, extending the battery life when the battery is not a rechargeable battery or not recharged by energy harvesting, for example.

In the illustrated example of FIG. 6, the backscatter modulator comprises an XNOR gate (exclusive NOR gate) 625, to implement the frequency shifting. It should be appreciated that any other type of a digital mixer can be used. In the XNOR gate 625 a mixing operation happens between a master clock signal 62-5 and a packet bit 62-6 that is loaded from the memory 623 by the backscatter modulator 624. During the mixing operation, the master clock signal 62-5 is based on the external clock signal, e.g. the high-frequency external clock signal. Hence, the XNOR gate 625 achieves a low-complexity digital frequency up conversion, without utilizing an RF mixer component (The RF mixer component refers to a digital mixer, not to a full-fledged RF mixer.) The XNOR gate 625 outputs the modulated frequency shifted carrier signal 62-7 in a digital form, which will result an analog backscatter signal at the antenna 650.

Figure 7:
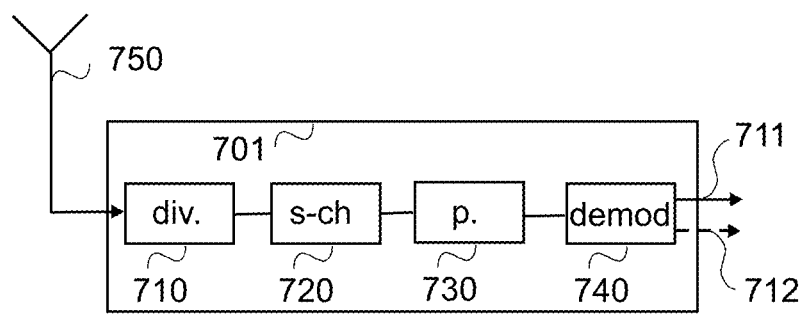
FIG. 7 is a schematic block diagram of an example of a receiver device.
Figure 8:
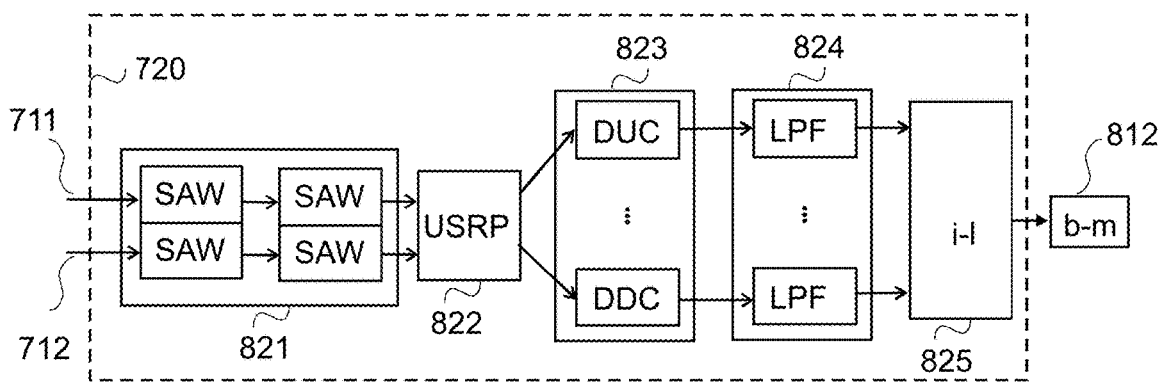
FIG. 8 is a schematic block diagram of an example of a sub-channelizer.
Figure 9:
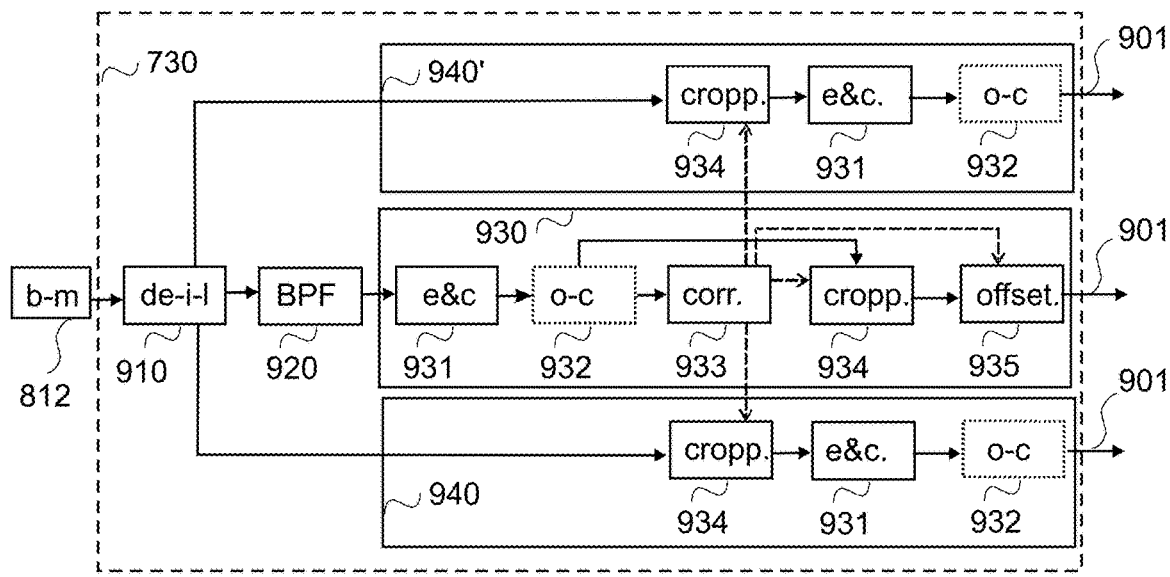
FIG. 9 is a schematic block diagram of an example of a packetizer.
Figure 10:
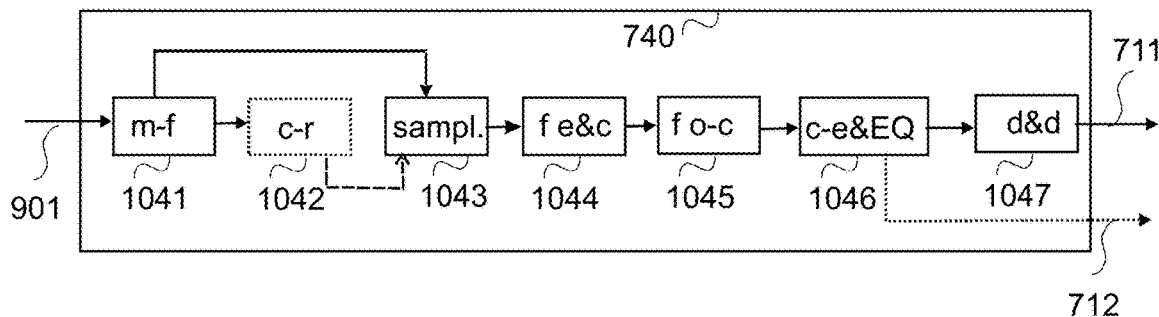
FIG. 10 is a schematic block diagram of an example of a demodulator.

FIG. 7 is a schematic block diagram of an example functional block arrangement of a receiver device, and FIG. 8, FIG. 9 and FIG. 10 illustrate some of the functional blocks in more detail, without limiting functional block arrangement to disclosed solutions. A functional block may be implemented as a circuitry or as a combination of circuitry (circuitries) and digital processing block(s). The receiver device, or an apparatus comprising the receiver device, may be any electronic device configurable at least to receive backscatter signals and jointly determine data and ranging information from the backscatter signals. A non-limiting list of examples of the receiver device, or the apparatus, comprises different types of access nodes, e.g. wireless local area access points, different types of base stations, such as eNBs, gNBs, split gNBs, transmission-reception points, nodes operationally coupled to one or more remote radio heads, donor nodes in integrated access and backhaul (IAB), fixed IAB nodes, proprietary custom receiving devices, etc.

In the illustrated example of FIG. 7, the receiver device 701 comprises a divider (div.) 710, for example a 3 dB power divider, for splitting, or dividing, signals received via an antenna element 750 to a first sub-signal and to a second sub-signal. The first sub-channel may correspond to the backscatter channel and the second sub-channel may correspond to the carrier channel. The divider 710 is followed by a sub-channelizer (s-ch) 720 that is followed by a packetizer (p.) 730, which is followed by a demodulator 740 outputting decoded data 711 and ranging information 712, for example ranging phases for distance estimate determination. The decoded data is data from the backscatter device(s). FIG. 8 illustrates an example functional block arrangement of the sub-channelizer, FIG. 9 illustrates an example functional block arrangement of the packetizer and FIG. 10 illustrates an example functional block arrangement of the demodulator.

Referring to FIG. 8, the sub-channelizer 720 comprises channelizing filters 821. A non-limiting list of channelizing filters include cavity resonator filters, active filters, surface acoustic wave, SAW, filters, etc. To maximize a dynamic range of the receiver device, the filters may be designed to sufficiently reject the carrier signal power. For example, the filters 821 may be stacked, as in the example of FIG. 8, for higher out-of-channel rejection. In other words, the sub-channelizer comprises one or more first filters for the first sub-signals 711 and one or more second filters for the second sub-signals 712. The one or more first filters may have a different frequency range than the one or more second filters. For example, a first filter may be a band pass filter with frequency 902 to 928 MHz and a second filter may be a band pass filter with frequency 869 to 894 MHz. A non-limiting example of a sufficient rejection of signal power includes a rejection of better than 30 dB of the carrier signal in the backscatter channel and rejection better than 30 dB of the backscatter signal in the carrier channel.

The outputs of the filters 821 are then input to a circuitry converting radio frequency signals to baseband, i.e. to quadrature (I/Q) signals (waveforms). In the illustrated example of FIG. 8, the output of the first filter(s) are input to a corresponding input in an universal software radio peripheral, USRP, 822, for example to an input for central frequency of 912.5 MHz. Correspondingly, the output of the second filter(s) are input to a corresponding input in the universal software radio peripheral 822, for example to an input for central frequency of 888.5 Mhz. The universal software radio peripheral 822 may have a sampling rate 10 MS/s per a quadrature channel, providing 4×10 MS/s real streams. Other non-limiting examples of a circuitry converting radio frequency signals to baseband include a custom RF-front end followed by high-speed analog-to-digital converters, or a system-on-a-chip platform with embedded analog-to-digital converters.

In the illustrated example of FIG. 8, the sub-channelizer 720 further comprises a bank 823 of a plurality of digital converters including one or more digital up converters, DUC, and one or more digital down converters, DDC, followed by a bank 824 of a plurality of low pass filters, for example decimating low pass filters. Inputting the streams from the universal software radio peripheral to a digital domain of the banks 823 and 824 further sub-channelizes the backscatter signals received by the receiver device and results to a plurality of low bandwidth streams that are easier to process than a stream with a bandwidth corresponding to the bandwidth of the backscatter channel.

In the illustrated example of FIG. 8, the sub-channelizer 720 further comprises an interleaver (i-l) 825. The interleaver 825 receives the streams from the plurality of the low pass filters, and interleaves them to a buffer memory (b-m) 812, which may be a first-in-first-out buffer, storing temporarily the streams, i.e. the digital samples. It should be appreciated that the interleaver is an optional element, not always needed. For example, in implementations in which the streams from the filters 824 can be parallelly fed to the packetizer 730, the sub-channelizer may not comprise the interleaver.

Referring to FIG. 9, the packetizer 730 processes the streams in the buffer memory 812. For that purpose, the packetizer 730 of the example of FIG. 9 comprises a de-interleaver 910, a bandpass filter (BPF) 920, a packet detector 930 of a first type and two packet detectors 940, 940' of a second type, the packet detectors outputting packetized data 901. It should be appreciated that the packetizer may comprise one packet detector of the second type. The de-interleaver 910 deinterleaves the streams interleaved by the interleaver and determines from the streams whether there are both a pair of carrier signals and a pair of corresponding backscatter signals. In other words, the de-interleaver 910 determines whether there is a set of two pairs. In implementations in which there is no interleaver in the sub-channelizer, for example when there are parallel outputs from the sub-channelizer to the packetizer, the streams are not de-interleaved, but the de-interleaver 910, or another functional block determines from the streams whether there are a pair of a carrier signals and a pair of backscatter signals.

The packet detector 930 of the first type comprises a carrier frequency offset estimation and compensation unit (e&c) 931, digital conversion offset compensation unit (o-c) 932, a preamble correlation unit (corr.) 933, a packet cropping unit (cropp.) 934, and a phase offsetting unit (offset.) 935, which outputs packetized data 901.

The packet detector 940, 940' of the second type comprises the packet cropping unit 934, the carrier frequency offset estimation and compensation unit 931 and digital conversion offset compensation unit 932, which outputs the packetized data 901.

Any of the packet detectors 930, 940, 940' may operate on one of the backscatter sub-channels (lower backscatter response, upper backscatter response) since they have passed DDC/DUC processing, or on carrier sub-channels. The carrier sub-channels may be called carrier reference sub-channels. Operation of the packetizer 730 is described herein assuming that a first backscatter sub-channel, for example the one with the highest detected SNR, is processed by the packet detector 930 of the first type, and a carrier sub-channel and the second backscatter sub-channel are processed by the packet detectors 940, 940' of the second type. However, it should be appreciated that any other way to allocate which packet detector processes which sub-channel may be used.

Output of the de-interleaver 910 is fed to the packet cropping units 934 comprised in the packet detectors 940, 940' of the second type and to the bandpass filter 920, which filters the second backscatter response and the carrier sub-channel so that the packet detector 930 processes the first backscatter sub-channel (first backscatter response). The output of the bandpass filter 920 is fed to the carrier frequency offset estimation and compensation unit 931 comprised in the packet detector 930 of the first type. In the example of FIG. 9, in the packet detector 930 of the first type, the output of the carrier frequency offset estimation and compensation unit 931 is fed to the digital conversion offset compensation unit 932, whose output is fed to the preamble correlation unit 933 and to the packet cropping unit 934. The preamble correlation unit 933 is configured to determine a packet start index, which is fed (arrow head dashed lines) to the packet cropping units 934 in the packet detectors 930, 940, 940' to crop the first and the second backscatter sub-channels and the carrier sub-channel, respectively, and to the phase offsetting unit 935. The output of the packet cropping unit 934 in the packet detector 930 of the first type is input to the phase offsetting unit 935, which outputs packetized data 901. The output of the packet cropping units 934 in the packet detectors 940, 904' of the second type is input to corresponding carrier frequency offset estimation and compensation units 931, whose output is fed to corresponding digital conversion offset compensation units 932. In other words, following successful packet detection, the index information that comes out of block 933 is used to crop the signal on the second backscatter sub-channel using detector 940, and to crop the signal on the carrier sub-channel using detector 940'. This works also for frequency pairs having different carrier frequency offsets per a signal, since they are coming from different transmitter devices.

The packetizer 730 may be implemented by any digital signal processing processor, for example.

Referring to FIG. 10, the demodulator 740 processes the packetized data 901 output by the packetizer. For that purpose, the demodulator 740 comprises a matched filtering unit (m-f) 1041, a clock recovery unit (c-r) 1042, a sampling unit (sampl.) 1043, a fine carrier frequency offset estimation and compensation unit (f e&c) 1044, a fine digital conversion offset compensation unit (fo-c) 1045, a channel estimation and equalization unit (c-e&EQ) 1046 and a detection and decoding unit (d&d) 1047. The packetized data 901 is input to the matched filtering unit 1041, whose output is fed to the clock recovery unit 1042 and to the sampling unit 1043. The sampling unit 1043 also receives as input the output of the clock recovery unit 1042. The output of the sampling unit 1043 is fed to the fine carrier frequency offset estimation and compensation unit 1044, whose output is fed to the fine digital conversion offset compensation unit 1045. The output of the fine digital conversion offset compensation unit 1045 is fed to the channel estimation and equalization unit 1046, which outputs ranging information 712, for example a ranging phase, for distance estimation that may be performed later. Further, the output of the channel estimation and equalization unit 1046 is fed to the detection and decoding unit 1047, which outputs decoded data 711. The decoded data 711 may comprise data modulated by a backscatter device, for example an identifier of the backscatter device or sensor data, e.g measured values.

It should be appreciated that the above examples of the functional block arrangements are non-limiting examples, and in the following different example functionalities of the transmitter device, the backscatter device and the receiver device are described without tying the functionality to a specific functional block or sub-unit or circuitry.

Figure 11:
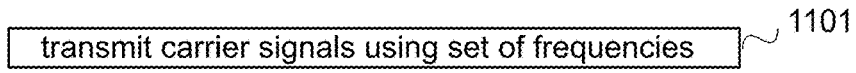
FIG. 11 illustrates an example functionality of a transmitter device.

Referring to FIG. 11, the transmitter device may transmit (block 1101) carrier signals using a set of frequencies, the set comprising two or more different frequencies. The set of frequencies may be preset, for example preconfigured, to the transmitter device. The transmitter device may be configured to transmit the carrier signals at certain time intervals, monitored by its internal clock, without synchronizing the timing with any device, e.g. a backscatter device or a receiver device, and without coordinating the transmissions of the carrier signals with any receiver device.

Figure 12:
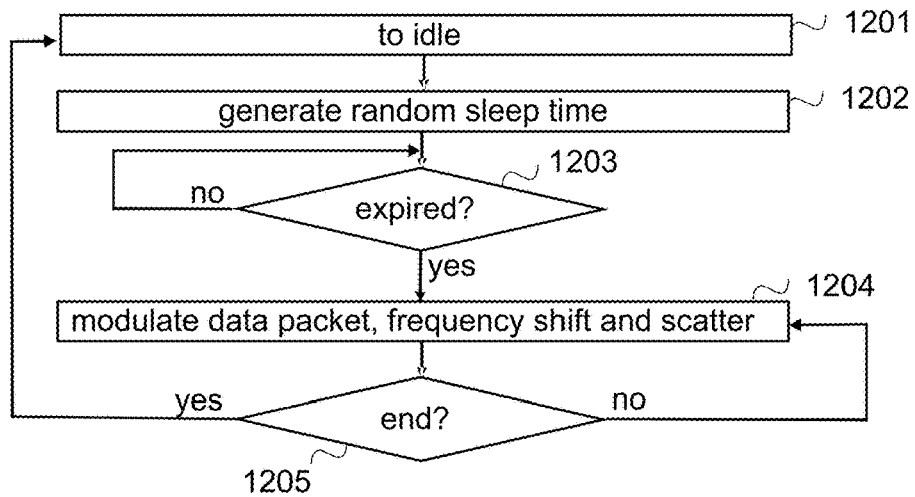
FIG. 12 illustrates an example functionality of a backscatter device.

FIG. 12 is a flow chart illustrating an example functionality of a backscatter device that is configured to be in an idle state or in a backscatter state.

Referring to FIG. 12, when the backscatter device enters (block 1201) the idle state, it generates (block 1202) a random sleep time, i.e. a sleep time with a random duration. During the random sleep time the backscatter device may harvest energy if it is configured to harvest energy. When the random sleep time expires (block 1203: yes), the backscatter device modulates (block 1204) data to a carrier signal, frequency shifts (block 1204), using a preconfigured frequency offset, caused by the external clock, e.g. external oscillator, for example, the carrier signal, and radiates, i.e. reflects or scatters, the modulated frequency shifted signal as a backscatter signal. When the data to be modulated ends (block 1205: yes), the backscatter device enters (block 1201) the idle state.

Figure 13:
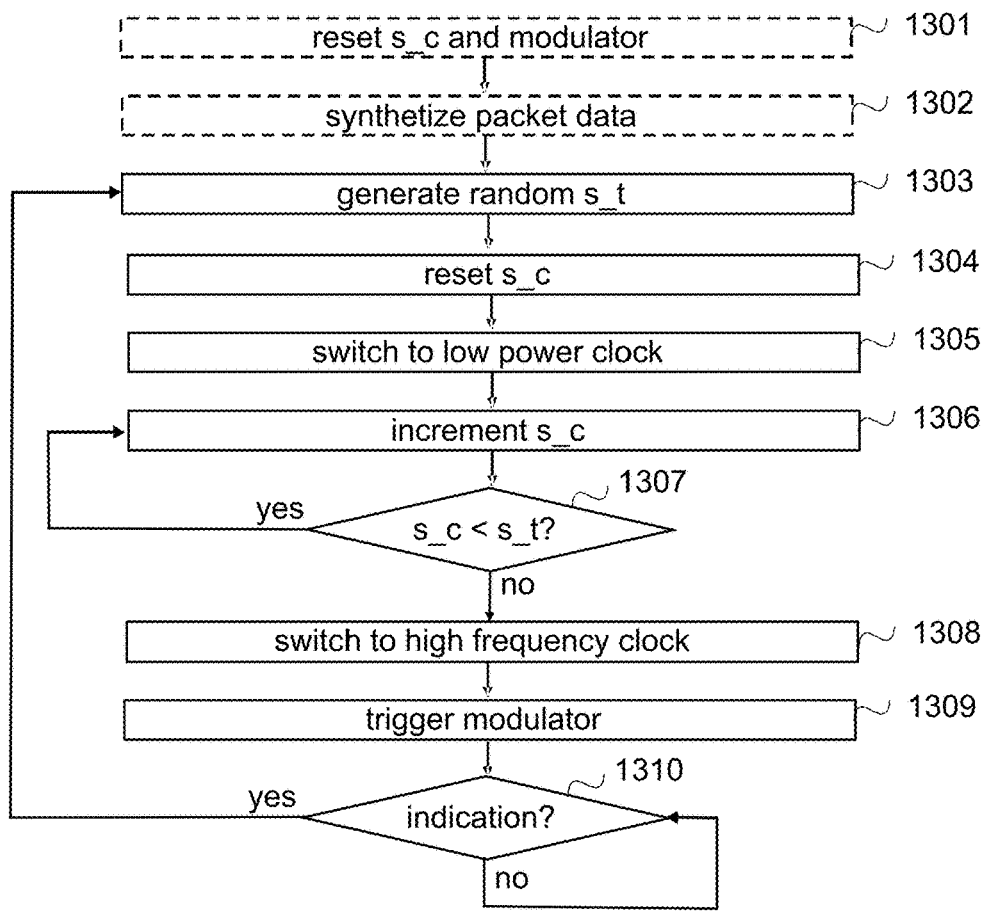
FIG. 13 illustrates another example functionality of a backscatter device.
Figure 14:
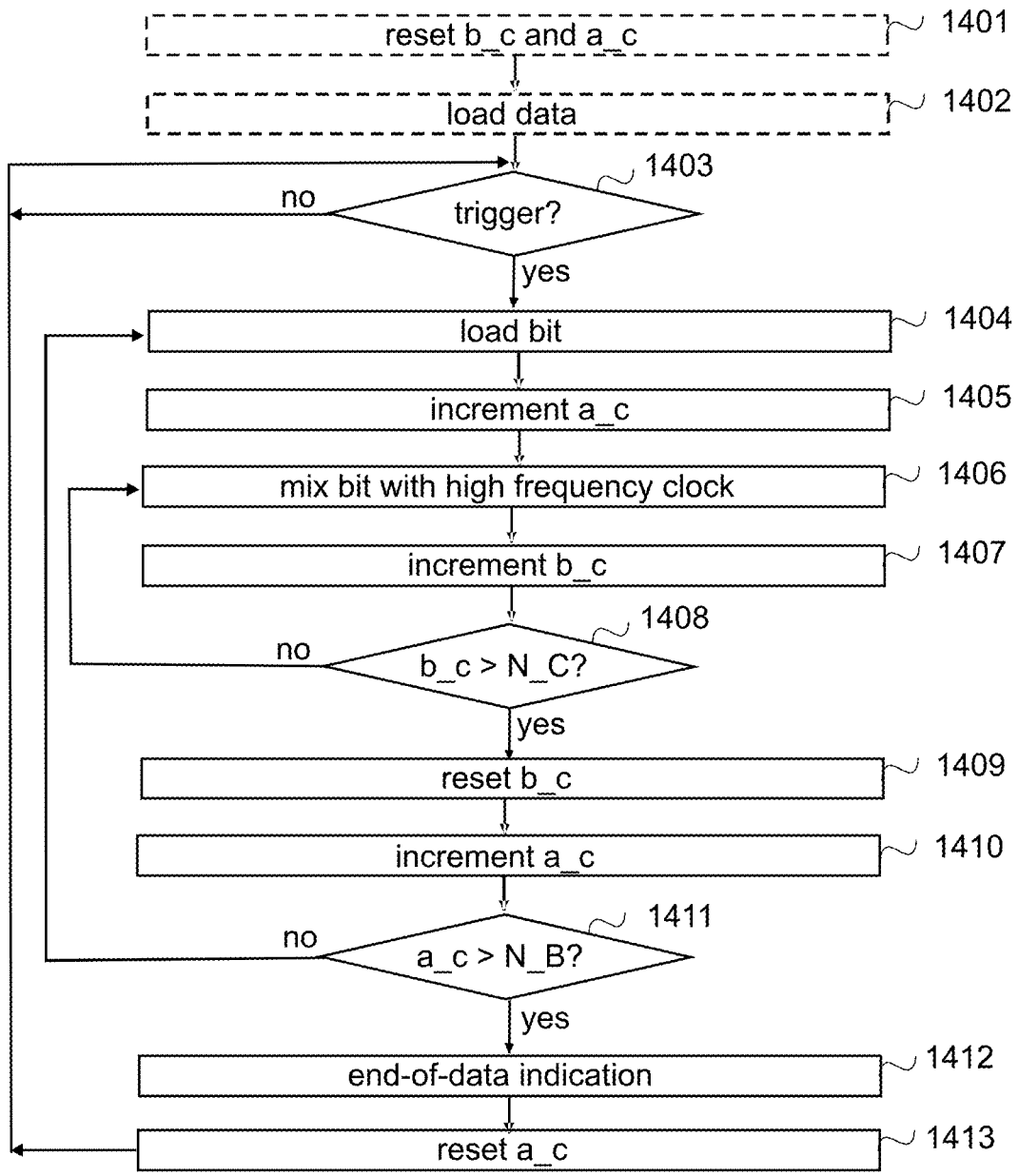
FIG. 14 illustrates another example functionality of a backscatter device.

FIG. 13 and FIG. 14 are flow charts illustrating another example functionality of a backscatter device having a circuit arrangement illustrated in FIG. 6. The functionality depicted in FIG. 13 may be performed by a finite state machine, for example a trigger manager or a trigger generator, illustrated in FIG. 6, and the functionality depicted in FIG. 14 may be performed by another finite state machine, for example a backscatter modulator illustrated in FIG. 6. Further, in the example it is assumed that data is transmitted in data packets, packet by packet, without limiting the solution to packet transmissions.

When the backscatter device is initialized, for example a reset signal initializing all modules or units in the backscatter device is received, a sleep counter s_c and a modulator are reset (block 1301) and data is synthesized (block 1302). In other words, when data is transmitted in packets, different pieces of data for a packet, the pieces being stored in the memory, are put together (interleaved) in a packet when the reset signal is received. The different pieces of data comprises at least at least a backscatter device identifier, and they may comprise a header, a payload and/or sensor data. Further, a random sleep time value s_t is generated (block 1303) and a sleep counter s_c is reset (block 1304), for example set to value 0. The random sleep time value represents the number of low power clock cycles, or internal clock cycles, that the backscatter device will be placed in a sleep mode. Further, a switch to a low power clock is performed (block 1305). It should be appreciated that blocks 1303, 1304 and 1305 may be performed simultaneously or in another order. Then the sleep counter s_c is incremented (block 1306) as long as (block 1307: yes) the value of the sleep counter s_c has not reached the random sleep time value s_t.

When the value of the sleep counter s_c has reached the random sleep time value s_t (block 1307: no) a switch to a high frequency clock (external clock) is performed (block 1308), and the backscatter modulator is triggered (block 1309), for example by sending a trigger signal. This triggers also the functionality illustrated and described with reference to FIG. 14. Then an indication indicating end of data is waited for (block 1310). When the indication is received (block 1310: yes) from the backscatter modulator, the process continues to block 1303, to be in an idle state a period with a random duration.

Referring to FIG. 14, when the backscatter device is initialized, also a bit counter b_c and an address counter a_c are initialized (block 1401), for example set to zero, and data (synthetized data), which in the example is packet data, is loaded (block 1402) in its temporary memory from a memory comprised in the backscatter device.

Then a trigger, for example a trigger signal, is waited for (block 1403). When block 1309 in FIG. 13 is performed, the trigger is received (block 1403: yes), a bit from the (packet) data is loaded (block 1404) into a register, an address counter a_c is incremented (block 1405). The bit is mixed (block 1406) with the high frequency external clock and the bit counter b_c is incremented (block 1407) per a clock cycle. The mixing (block 1406) and the incrementing the bit counter (block 1407) are repeated until (block 1408) the value of the bit counter b_c exceeds a parameter value N_C. The parameter value N_C defines a number of clock cycles per bit, N_CYCLES_PER_BIT, which may be a parameter of the multistatic backscatter system. In other words, the parameter value N_C may be a preset value. The parameter value N_C determines the bit rate. By performing blocks 1406, 1407 and 1408, the mixing operation of one bit last the number of clock cycles per a bit. When value of the bit counter b_c exceeds the parameter value N_C (block 1408: yes), the bit counter b_c is reset (block 1409) to zero, (block 1410) to point to a next bit and the value of the address counter a_c is incremented (block 1410), to move an address pointer. Then it is checked, whether the value of the address counter a_c exceeds a parameter value N_B. The parameter value N_B defines a number of bits per a packet, N_BITS_PER_PACKET, which also may be a parameter of the multistatic backscatter system. In other words, the parameter value N_B may be a preset value. The parameter value N_B determines the size of the packet, or packet length. If the value of the address counter a_c does not exceed the parameter value N_B (block 1411: no), the process continues to block 1404 to load a next bit, to repeat the process of loading and mixing a bit. When the value of the address counter a_c exceeds the parameter value N_B (block 1411: yes) a data transmission, in the example a packet transmission, is complete, and the end-of-data indication, e.g end-of-packet indication, is (block 1412) signaled to the trigger manager, to place the backscatter device into the idle state (low-power sleep mode). Further, the address counter a_c is reset (block 1413) to zero, and the process returns to block 1403 to wait for a trigger.

Figure 15:
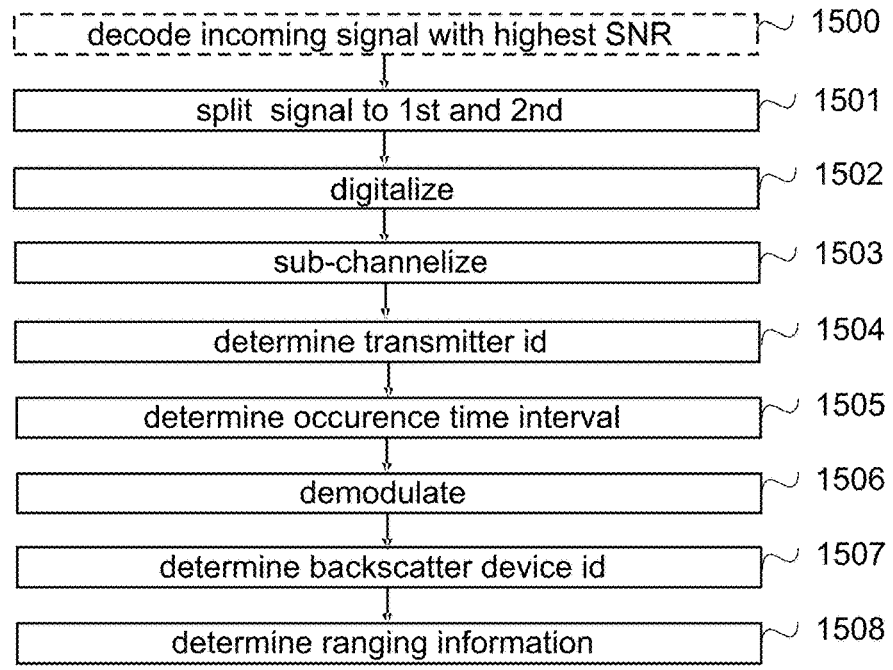
FIG. 15 illustrates an example functionality of a receiver device.
Figure 16:
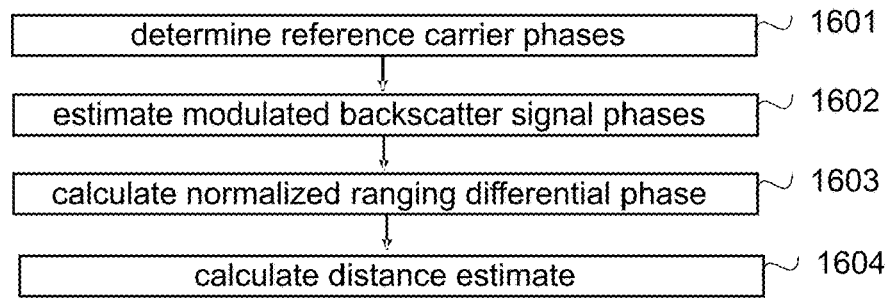
FIG. 16 illustrates another example functionality of a receiver device.

FIG. 15 and FIG. 16 illustrates different example functionalities of an unsynchronized receiver device.

Referring to FIG. 15, depending on an implementation and/or a number of concurrently incoming backscatter signals in different frequencies, one with highest SNR will be decoded (block 1500), or processed. (The higher SNR of a signal is, the higher is the correlation produced at the packetizer.) The incoming signal, or the incoming signal to be processed, is split (block 1501), for example via power dividing and filtering, into at least two sub-signals, or channels, i.e. at least to a first sub-signal and a second sub-signal, for example to extract ranging information for one or more backscatter devices.

The first sub-signal and the second sub-signal are digitalized (block 1502) within sampling capabilities of an analog-to-digital converter comprised in the receiver device.

Then the first sub-signal and the second sub-signal are sub-channelized (block 1503), for example the first sub-signal into two or more, i.e. N, carrier sub-channels and the second sub-signal into two or more, i.e. N, backscatter sub-channels, or vice versa. The sub-channelizing may include down converting or up converting a sub-channel. More precisely, the N carrier sub-channels and N backscatter sub-channels are centered around a different frequency with a target to bring the sub-channels around frequency 0, or direct current (DC). Since they are complex, a positive frequency is different from a negative frequency. If a sub-channel is centered around a positive frequency, a digital down conversion takes place, and correspondingly, if centered around a negative frequency, a digital up conversion takes place. The thus obtained quadrature (I/Q) signals, or complex waveforms, may be temporarily stored.

An identifier, for example an index, of a transmitter device is determined (block 1504) per a set of two pairs comprising a pair of carrier sub-channels and a pair of corresponding backscatter sub-channels. For example, via a coarse spectrum analysis, the carrier signal frequencies, and the backscatter signal frequencies may be determined, or at least one of the carrier signal frequencies may be determined, and based on the information the receiver device comprises or has access to, the information associating a transmitter device with frequencies in the set of frequencies of the transmitter device, the identifier of the transmitter device may be determined based on frequencies determined. In the multiple access scheme also time information may be used to determine the identifier of the transmitter device. The identifier may be stored for a later use. Further, in the bistatic deployment scenario having one transmitter device, block 1504 may be omitted since the transmitter device is known.

An occurrence time interval of an occurrence of a backscatter signal, and hence occurrence, or presence, of data, e.g. a data packet, from a backscatter device is determined (block 1505). The occurrence time interval determines a start time and end time of the data. For example, time index values for the start and the end may be determined for the occurrence time interval. For example, when data packets are used, packet synchronization with preamble correlation techniques may be performed to one of the quadrature (I/Q) signals obtained in block 1502 to obtain the time index values. The time index values may be temporarily stored.

The occurrence time interval, e.g. the start time and the end time are used to demodulate (block 1506) data (tag data) from the N back-scatter sub-channels, or waveforms, during the occurrence time interval, e.g. between the start time and the end time, to obtain data modulated on the backscatter signal by the backscatter device. The data comprises at least a backscatter device identifier, which may be unique within the backscatter system, and hence at least the backscatter device identifier is determined (block 1507), or extracted, and the data, or at least the backscatter device identifier, is stored to the memory. The N backscatter sub-channels will include the same data even though the phase is different, and hence reception of the data is more secure. However, the same data received over different sub-channels will be stored only once.

Also ranging information is determined (block 1508), and stored for later use, for example stored in association with the backscatter device identifier. At the simplest the determining the ranging information may comprise estimating signal phases of the N back-scatter sub-channels. Even though the N back-scatter sub-channels include the same data, the relative path dependent phases are different, which is what enables ranging operation.

The process of FIG. 15 is performed when there are incoming signals that can be split into pairs of a backscatter signal and a carrier signal.

FIG. 16 illustrates another example of determining the ranging information, i.e. what may be performed during block 1508.

Referring to FIG. 16, reference carrier phases $\varphi\_c\_1$ and $\varphi\_c\_2$ from the two carrier waveforms in the pair of carrier sub-channels during the occurrence time interval, e.g. between t_start, i.e. a start time of data, and t_end, i.e. an end time of the data, are determined (block 1601). In other words, a phase of a first frequency and a phase of a second frequency used by a transmitter device are determined. By determining the reference carrier phases it is taken into account that a local oscillator phase in a transmitter device is not coherent with a local oscillator phase in the receiver device. Further, this ensures that there is no need for time synchronization between the transmitter device and the receiver device. The two reference carrier phases may be stored.

Further, corresponding modulated backscatter signal phases $\varphi\_1$ and $\varphi\_2$ in the pair of backscatter sub-channels during the occurrence time interval, e.g. between the start time and the end time of the data are estimated (block 1602) and may be stored.

Then a normalized ranging differential phase is calculated (block 1603), using the earlier determined phases, for example as follows:

$$\Delta\varphi = (\varphi\_1 - \varphi\_2) - (\varphi\_c\_1 - \varphi\_c\_2)$$

The normalized ranging differential phase may be stored.

A distance estimate d-est_i for a backscatter device i is calculated (block 1604) from its normalized ranging differential phase, for example as follows:

$$d\_est\_i = (c/(2\pi))(\Delta\varphi\_i / \Delta f\_i)$$

wherein
c=speed of light,
$\Delta f\_i$=frequency difference between frequencies in the set (preconfigured to a transmitter device identified).

The distance estimate may be stored to a long term memory along with the backscatter device identifier (tag ID) and a capture timestamp indicating time when a start of an occurrence time, or a start of a data packet received, is detected. The stored estimates can be directly used for 1D ranging, or 2D/3D positioning when sufficient amount of non-redundant distance estimates have been obtained. For example, 2D localization of the backscatter device may be when at least 3 ranging estimates of the backscatter device are altogether obtained from the receiver device(s), regardless of with which transmitter device(s) the ranging estimates are associated. Correspondingly, 3D localization of the backscatter device may be performed when at least 4 ranging estimates of the backscatter device are altogether obtained from the receiver device(s), regardless of with which transmitter device(s) the ranging estimates are associated.

Further, it may be that two or more receiver devices are deployed in the backscatter system. In such multi-receiver deployments, it may be that all receiver devices are individually implementing the functionality discussed above with reference to FIG. 15 and FIG. 16. Further, at the end of an inventory cycle, for example, all receiver devices share information about determined backscatter device identifiers, data received. The information may be shared, for example, by collecting information at one receiver device, or centrally collecting the information in a shared backend or in a cloud. Such a multi-receiver deployment increases spatial diversity of backscatter device reception. Within similar deployments, i.e. any deployment with transmitter devices/illuminators and receiver device(s)/reader(s) spread in an area without tight clock synchronization, including bistatic deployment, 2D or 3D localization of backscatter devices are possible by utilizing backscatter ranging information, obtained as described in the present disclosure, and positioning techniques such as ellipsoid trilateration.

The blocks, sub-units, related functions and information exchanges (e.g. signals) described herein by means of FIG. 1 to FIG. 16 are in no absolute chronological order, and some of them may be performed simultaneously or in an order differing from the given one. Other functions can also be executed between them or within them, and other information may be transmitted or backscattered, and/or other rules applied. Some of the blocks or part of the blocks or one or more pieces of information can also be left out or replaced by a corresponding block or part of the block or one or more pieces of information.

Figure 17:
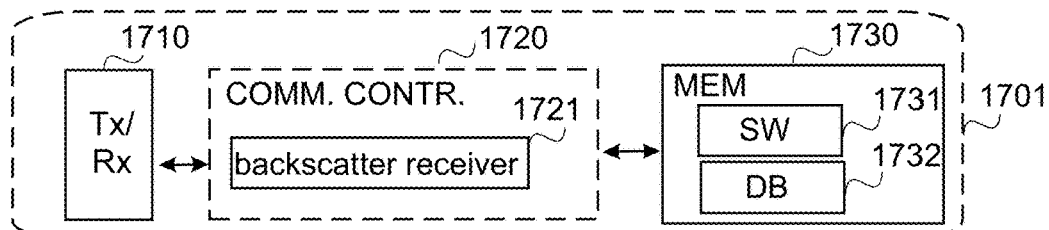
FIG. 17 is a schematic block diagram.
Figure 18:
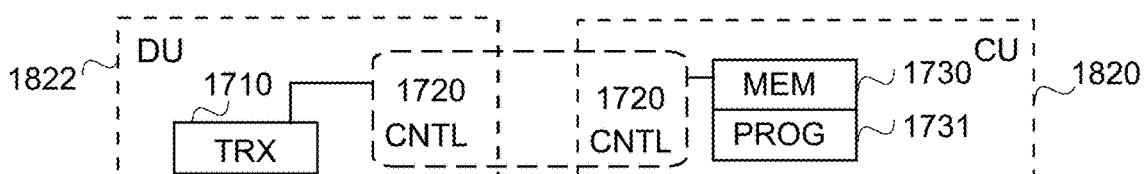
FIG. 18 is a schematic block diagram.

FIG. 17 illustrates an apparatus 1701 according to some embodiments. The apparatus 1701 may be an apparatus, e.g. an electrical device, or other receiver device, for processing backscatter signals, and possibly for performing a 2D localization of a backscatter device using at least three ranging estimates of the backscatter device or a 3D localization of the backscatter device using at least four ranging estimates of the backscatter device. The apparatus 1701 may be and apparatus, e.g. an electrical device, or other transmitter device for transmitting carrier signals. The apparatus 1701 may be an apparatus, e.g. an electrical device, or other backscatter device for backscattering modulated frequency shifted carrier signals. The apparatus 1701 may be an apparatus, e.g. an electrical device, or other equipment in a cloud for performing a 2D localization of a backscatter device using at least three ranging estimates of the backscatter device or a 3D localization of the backscatter device using at least four ranging estimates of the backscatter device. For example, after at least said number of range estimates of a backscatter device are obtained at the apparatus 1701, an elliptic trilateration method described in Amiri, R., Behnia, F., & Sadr, M. A. M. (2017): "Exact solution for elliptic localization in distributed MIMO radar systems". IEEE Transactions on Vehicular Technology, Vol. 67, issue 2, pages 1075-1086, incorporated by reference herein, may be used for performing localization of the backscatter device. The algorithms disclosed therein for multiple receiver devices and one transmitter device are applicable for multiple transmitter devices and one receiver device as well. FIG. 18 illustrates an apparatus that may implement distributed functionality of the apparatus illustrated in FIG. 17. Different examples of such an apparatus are described herein with reference to at least FIG. 1.

The apparatus 1701 may comprise one or more communication control circuitries 1720, such as at least one processor, and at least one memory 1730, including one or more algorithms 1731, such as a computer program code (software) wherein the at least one memory and the computer program code (software) are configured, with the at least one processor, to cause the apparatus to carry out any one of the exemplified functionalities, described herein with reference to any of FIG. 1 to FIG. 16. Said at least one memory 1730 may also comprise at least one database 1732.

According to an embodiment, there is provided an apparatus comprising at least means for receiving signals comprising at least carrier signals and corresponding backscatter signals, which are frequency-shifted, modulated backscattered carrier signals, means for splitting the signals received at least to a first sub-signal and a second sub-signal, means for sub-channelizing at least the first and second sub-signals to two or more carrier sub-channels and two or more backscatter sub-channels to obtain at least one set of two pairs comprising a pair of carrier sub-channels and a pair of corresponding backscatter sub-channels, means for determining, per a set of pairs, an occurrence time interval of an occurrence of backscatter signal in a backscatter sub-channel, means for demodulating the backscatter sub-channel during the occurrence time interval to obtain data modulated to a backscatter signal, means for determining from the data obtained by demodulating at least an identifier of a backscatter device, and means for determining, during the occurrence time interval, ranging information for the backscatter device.

Referring to FIG. 17, the one or more communication control circuitries 1720 of the apparatus 1701 comprise at least a backscatter receiver circuitry 1721, for example the arrangement illustrated and described with reference to FIG. 7 to FIG. 10. To this end, the backscatter receiver circuitry 1721 of the apparatus 1701 is configured to carry out at least some of the functionalities described herein with the receiver device, e.g., by means of FIG. 1 to FIG. 16, using one or more individual circuitries.

Referring to FIG. 17, the memory 1730 may be implemented using any suitable data storage technology, such as semiconductor based memory devices, flash memory, magnetic memory devices and systems, optical memory devices and systems, fixed memory and removable memory.

Referring to FIG. 17, the apparatus 1701 may further comprise different interfaces 1710 such as one or more communication interfaces (TX/RX) comprising hardware and/or software for realizing communication connectivity according to one or more communication protocols. The one or more communication interfaces 1710 may enable connecting to the Internet and/or to a core network of a wireless communications network and/or to a cloud platform and/or to a radio access network and/or to other apparatuses, for example to backscatter devices and transmitter devices, within range of the apparatus. The one or more communication interface 1710 may provide the apparatus with communication capabilities to communicate in a cellular communication system, including backscatter system, and enable communication to different network nodes or elements. The one or more communication interfaces 1710 may comprise standard well-known components such as an amplifier, filter, frequency-converter, (de) modulator, and encoder/decoder circuitries, controlled by the corresponding controlling units, and possibly one or more antennas.

In an embodiment, as shown in FIG. 18, at least some of the functionalities of the apparatus of FIG. 17 may be shared between two physically separate devices, forming one operational entity. Therefore, the apparatus may be seen to depict the operational entity comprising one or more physically separate devices for executing at least some of the described processes. Thus, the apparatus of FIG. 18, utilizing such shared architecture, may comprise a remote control unit CU 1820, such as a host computer or a server computer, operatively coupled (e.g. via a wireless or wired network) to a remote distributed unit DU 1822. In an embodiment, at least some of the described processes may be performed by the CU 1820. In an embodiment, the execution of at least some of the described processes may be shared among the DU 1822 and the CU 1820.

Similar to FIG. 17, the apparatus of FIG. 18 may comprise one or more communication control circuitries (CNTL) 1720, such as at least one processor, and at least one memory (MEM) 1730, including one or more algorithms (PROG) 1731, such as a computer program code (software) wherein the at least one memory and the computer program code (software) are configured, with the at least one processor, to cause the apparatus to carry out any one of the exemplified functionalities of the receiver device described herein.

In an embodiment, the CU 1820 may generate a virtual network through which the CU 1820 communicates with the DU 1822. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the CU). External network virtualization is targeted to optimized network sharing. Another category is internal virtual networking which provides network-like functionality to the software containers on a single system. Virtual networking may also be used for testing the transmitter device or the backscatter device.

In an embodiment, the virtual network may provide flexible distribution of operations between the DU and the CU. In practice, any digital signal processing task may be performed in either the DU or the CU and the boundary where the responsibility is shifted between the DU and the CU may be selected according to implementation.

The embodiments described in this application are only presented as examples. Although the specification may refer to "an", "one", or "some" embodiment(s) and/or example(s) in several locations, this does not necessarily mean that each such reference is to the same embodiment(s) or example(s), or that a particular feature only applies to a single embodiment and/or single example. Single features of different embodiments and/or examples may also be combined to provide other embodiments and/or examples. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the elements are not restricted by the terms. The terms are used merely for the purpose of distinguishing an element from other elements. For example, a first element could be termed an element or a second element, and similarly, a second element could be also termed a first element or an element without departing from the scope of the present disclosure.

5G-Advanced, and beyond future wireless networks aim to support a large variety of services, use cases and industrial verticals, for example unmanned mobility with fully autonomous connected vehicles, other vehicle-to-everything (V2X) services, or smart environment, e.g. smart industry, smart power grid, or smart city, just to name few examples. To provide variety of services with different requirements, such as enhanced mobile broadband, ultra-reliable low latency communication, massive machine type communication, wireless networks are envisaged to adopt network slicing, flexible decentralized and/or distributed computing systems and ubiquitous computing, with local spectrum licensing, spectrum sharing, infrastructure sharing, and intelligent automated management underpinned by mobile edge computing, artificial intelligence, for example machine learning, based tools, cloudification and blockchain technologies. For example, in the network slicing multiple independent and dedicated network slice instances may be created within the same infrastructure to run services that have different requirements on latency, reliability, throughput and mobility.

6G (sixth generation) networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a transmitter device or a backscatter device or a receiver device, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for a receiver device or a transmitter device or a backscatter device or other computing or network device.

In an embodiment, at least some of the processes illustrated and described in connection with FIG. 1 to FIG. 16 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIG. 1 to FIG. 16 or operations thereof.

Embodiments and examples as described may also be carried out in the form of a computer process defined by a computer program or portions thereof. Embodiments of the functionalities described in connection with FIG. 1 to FIG. 16 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. The term "non-transitory," as used herein, is a limitation of the medium itself (i.e., tangible, not a signal) as opposed to a limitation on data storage persistency (e.g., RAM vs. ROM). Coding of software for carrying out the embodiments as shown and described is well within the scope of a person of ordinary skill in the art.

Some example embodiments described herein may be implemented, as described in the present disclosure, in a wireless communication network comprising a radio access network based on one or more of the following radio access technologies: Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications.

Figure 19:
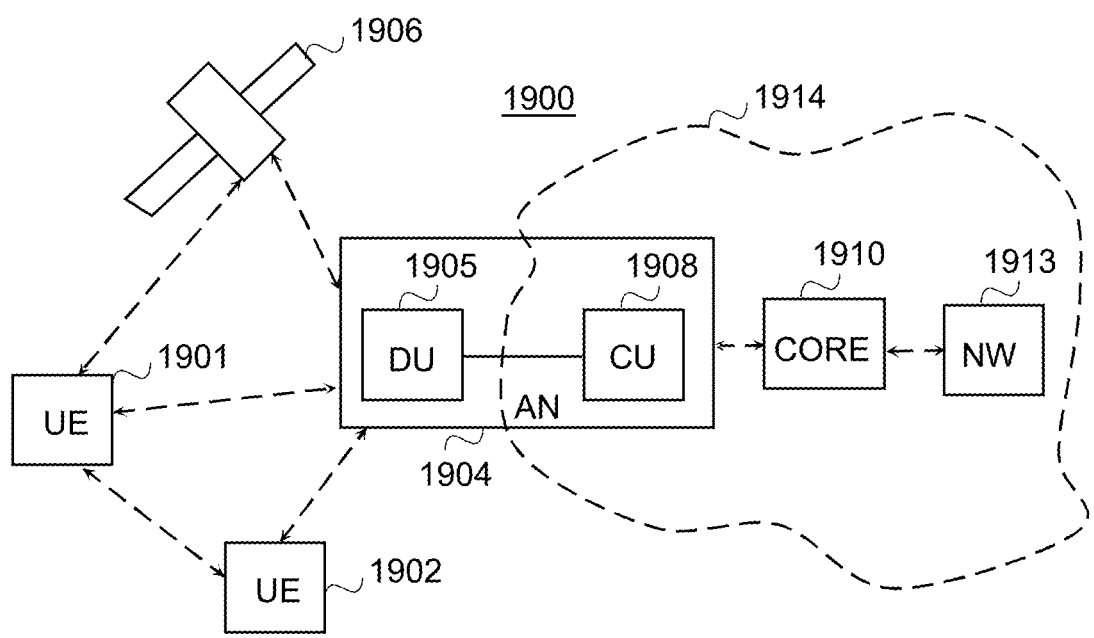
FIG. 19 illustrates an exemplified high-level network architecture.

FIG. 19 depicts an example of a simplified wireless communication network 1900 showing some physical and logical entities. The connections shown in FIG. 19 may be physical connections or logical connections. It is apparent to a person skilled in the art that the wireless communication network may also comprise other physical and logical entities than those shown in FIG. 19.

The example embodiments described herein are not, however, restricted to the wireless communication network given as an example but a person skilled in the art may apply the embodiments described herein to other wireless communication networks provided with necessary properties.

The example wireless communication network 1900 shown in FIG. 19 includes an access network, such as a radio access network (RAN), and a core network 1910.

FIG. 19 shows user equipment (UE) 1901, 1902 configured to be in a wireless connection on one or more communication channels in a radio cell with an access node (AN) 1904 of an access network. The AN 1904 may be an evolved Node B (abbreviated as eNB or eNodeB) or a next generation Node B (abbreviated as gNB or gNodeB), providing the radio cell. The wireless connection (e.g., radio link) from a UE to the access node 1904 may be called uplink (UL) or reverse link, and the wireless connection (e.g., radio link) from the access node to the UE may be called downlink (DL) or forward link. UE 1901 may also communicate directly with UE 1902, and vice versa, via a wireless connection generally referred to as a sidelink (SL). It should be appreciated that the access node 1904 or its functionalities may be implemented by using any node, host, server or access point etc. entity suitable for providing such functionalities.

The access network may comprise more than one access node, in which case the access nodes may also be configured to communicate with one another over links, wired or wireless. These links between access nodes may be used for sending and receiving control plane signaling and also for routing data from one access node to another access node.

The access node may comprise a computing device configured to control the radio resources of the access node. The access node may also be referred to as a base station, a base transceiver station (BTS), an access point, a cell site, a radio access node or any other type of node capable of being in a wireless connection with a UE (e.g., UEs 1901, 1902). The access node may include or be coupled to transceivers. From the transceivers of the access node, a connection may be provided to an antenna unit that establishes bi-directional radio links to UEs 1901, 1902. The antenna unit may comprise an antenna or antenna element, or a plurality of antennas or antenna elements.

The access node 1904 may further be connected to a core network (CN) 1910. The core network 1910 may comprise an evolved packet core (EPC) network and/or a 5th generation core network (5GC). The EPC may comprise network entities, such as a serving gateway (S-GW for routing and forwarding data packets), a packet data network gateway (P-GW) for providing connectivity of UEs to external packet data networks, and a mobility management entity (MME). The 5GC May comprise network functions, such as a user plane function (UPF), an access and mobility management function (AMF), and a location management function (LMF).

The core network 1910 may also be able to communicate with one or more external networks 1913, such as a public switched telephone network or the Internet, or utilize services provided by them. For example, in 5G wireless communication networks, the UPF of the core network 1910 may be configured to communicate with an external data network via an N6 interface. In LTE wireless communication networks, the P-GW of the core network 1910 may be configured to communicate with an external data network.

The illustrated UE 1901, 1902 is one type of an apparatus to which resources on the air interface may be allocated and assigned. The UE 1901, 1902 may also be called a wireless communication device, a subscriber unit, a mobile station, a remote terminal, an access terminal, a user terminal, a terminal device, or a user device just to mention but a few names. The UE may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or any computing device comprising a wireless modem integrated in a vehicle.

It should be appreciated that a UE may also be a nearly exclusive uplink-only device, of which an example may be a camera or video camera loading images or video clips to a network. A UE may also be a device having capability to operate in an Internet of Things (IoT) network, which is a scenario in which objects may be provided with the ability to transfer data over a network without requiring human-to-human or human-to-computer interaction. The UE may also utilize cloud. In some applications, the computation may be carried out in the cloud or in another UE.

The wireless communication network may also be able to support the usage of cloud services, for example at least part of core network operations may be carried out as a cloud service (this is depicted in FIG. 19 by cloud 1914). The communication system may also comprise a central control entity, or the like, providing facilities for wireless communication networks of different operators to cooperate for example in spectrum sharing.

Various techniques described herein may also be applied to a cyberphysical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

5G enables using multiple input-multiple output (MIMO) antennas in the access node 1904 and/or the UE 1901, 1902, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine type applications, such as (massive) machine-type communications (mMTC), including vehicular safety, different sensors and real-time control.

In 5G wireless communication networks, access nodes and/or UEs may have multiple radio interfaces, namely below (or less than) 6 GHz, cmWave and mmWave, and also being integrable with existing legacy radio access technologies, such as the LTE. Integration with the LTE may be implemented, for example, as a system, where macro coverage may be provided by the LTE, and 5G radio interface access may come from small cells by aggregation to the LTE. In other words, a 5G wireless communication network may support both inter-RAT operability (such as LTE-5G) and inter-RI operability (inter-radio interface operability, such as below (or less than) 6 GHz-cmWave-mmWave). One of the concepts considered to be used in 5G wireless communication networks may be network slicing, in which multiple independent and dedicated virtual sub-networks (network instances) may be created within the substantially same infrastructure to run services that have different requirements on latency, reliability, throughput and mobility.

5G may enable analytics and knowledge generation to occur at the source of the data. This approach may involve leveraging resources that may not be continuously connected to a network, such as laptops, smartphones, tablets and sensors. Multi-access edge computing (MEC) may provide a distributed computing environment for application and service hosting. It may also have the ability to store and process content in close proximity to cellular subscribers for faster response time. Edge computing may cover a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

In some example embodiments, an access node (e.g., access node 1904) may comprise: a radio unit (RU) comprising a radio transceiver (TRX), i.e., a transmitter (Tx) and a receiver (Rx); one or more distributed units (DUs) 1905 that may be used for the so-called Layer 1 (L1) processing and real-time Layer 2 (L2) processing; and a central unit (CU) 1908 (also known as a centralized unit) that may be used for non-real-time L2 and Layer 3 (L3) processing. The CU 1908 may be connected to the one or more DUs 1905 for example via an F1 interface. Such an embodiment of the access node may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 1908 may be a logical node hosting radio resource control (RRC), service data adaptation protocol (SDAP) and/or packet data convergence protocol (PDCP), of the NR protocol stack for an access node. The DU 1905 may be a logical node hosting radio link control (RLC), medium access control (MAC) and/or physical (PHY) layers of the NR protocol stack for the access node. The operations of the DU may be at least partly controlled by the CU. It should also be understood that the distribution of functions between DU 1905 and CU 1908 May vary depending on implementation. The CU may comprise a control plane (CU-CP), which may be a logical node hosting the RRC and the control plane part of the PDCP protocol of the NR protocol stack for the access node. The CU may further comprise a user plane (CU-UP), which may be a logical node hosting the user plane part of the PDCP protocol and the SDAP protocol of the CU for the access node.

Cloud computing systems may also be used to provide the CU 1908 and/or DU 1905. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the access network (e.g., RAN) by utilizing network function virtualization (NFV) and software defined networking (SDN). Using edge cloud may mean access node operations to be carried out, at least partly, in a computing system operationally coupled to a remote radio head (RRH) or a radio unit (RU) of an access node. It is also possible that access node operations may be performed on a distributed computing system or a cloud computing system located at the access node. Application of cloud RAN architecture enables RAN real-time functions being carried out at the access network (e.g., in a DU 1905) and non-real-time functions being carried out in a centralized manner (e.g., in a CU 1908).

It should also be understood that the distribution of functions between core network operations and access node operations may differ in future wireless communication networks compared to that of the LTE or 5G, or even be non-existent. Some other technology advancements that may be used include big data and all-IP, which may change the way wireless communication networks are being constructed and managed. 5G (or new radio, NR) wireless communication networks may support multiple hierarchies, where multi-access edge computing (MEC) servers may be placed between the core network 1910 and the access node 1904. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network, enabling more extensive network coverage. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). A given satellite 1906 in the mega-constellation may cover several satellite-enabled network entities that create on-ground cells. The on-ground cells may be created through an on-ground relay access node or by an access node 1904 located on-ground or in a satellite.

It is obvious for a person skilled in the art that the access node 1904 depicted in FIG. 19 is just an example of a part of an access network (e.g., a radio access network) and in practice, the access network may comprise a plurality of access nodes, the UEs 1901, 1902 may have access to a plurality of radio cells, and the access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of an access network (e.g., a radio access network), a plurality of different kinds of radio cells as well as a plurality of radio cells may be provided. Radio cells may be macro cells (or umbrella cells) which may be large cells having a diameter of up to tens of kilometers, or smaller cells such as micro-, femto- or pico-cells. The access node(s) of FIG. 19 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of access networks, the concept of "plug-and-play" access nodes may be introduced. An access network which may be able to use "plug-and-play" access nodes, may include, in addition to Home eNodeBs or Home gNodeBs, a Home Node B gateway, or HNB-GW (not shown in FIG. 19). An HNB-GW, which may be installed within an operator's access network, may aggregate traffic from a large number of Home eNodeBs or Home gNodeBs back to a core network of the operator.

Even though the embodiments have been described in the present disclosure with reference to examples according to the accompanying drawings, it is clear that the embodiments are not restricted thereto but can be modified in several ways within the scope of the claims. Therefore, all words and expressions should be interpreted broadly and they are intended to illustrate, not to restrict, the embodiment. It will be obvious to a person skilled in the art that, as technology advances, the inventive concept can be implemented in various ways within the scope of the independent claims. Further, it is clear to a person skilled in the art that the described embodiments may, but are not required to, be combined with other embodiments in various ways within the scope of the independent claims.

The invention claimed is:

1. A multistatic backscatter system comprising
at least one transmitter device to transmit carrier signals over a frequency set of two or more different frequencies;
at least one backscatter device configured to frequency-shift the carrier signals, modulate data on at least some of the carrier signals, and backscatter modulated frequency-shifted carrier signals as backscatter signals; and
at least one receiver device configured at least to receive the carrier signals and the backscatter signals, split the signals received at least to a first sub-signal and a second sub-signal, sub-channelize at least the first and second sub-signals to two or more carrier sub-channels and two or more back-scatter sub-channels to obtain at least one set of two pairs comprising a pair of carrier sub-channels and a pair of corresponding backscatter sub-channels, determine, per a set of two pairs, an occurrence time interval of an occurrence of a backscatter signal in a backscatter sub-channel, demodulate the backscatter sub-channel during the occurrence time interval to obtain the data, determine from the data at least identifier of a backscatter device, and determine, based at least on the occurrence time interval, ranging information for the backscatter device, by determining a reference carrier phase per a carrier sub-channel in the pair of carrier sub-channels during the occurrence time interval, estimating a modulated backscatter signal phase per a backscatter sub-channel in the pair of corresponding backscatter sub-channels during the occurrence time interval, calculating a normalized ranging differential phase using reference carrier phases and modulated backscatter signal phases, and calculating a distance estimate for the backscatter device using the normalized ranging differential phase, wherein the distance estimate is the ranging information,
wherein the at least one transmitter device, the at least one backscatter device and the at least one receiver device are unsynchronized.

2. The multistatic backscatter system of claim 1, wherein the at least one receiver device is configured to determine an identifier of a transmitter device of the carrier signal based on at least a frequency of a carrier sub-channel in the set of two pairs.

3. The multistatic backscatter system of claim 1, wherein at least one of the at least one backscatter devices is a receiverless device configured to be in an idle state during a first period and backscatter the backscatter signals during a second period, the first period and the second period alternating, the length of the first period varying randomly.

4. The multistatic backscatter system of claim 3, wherein the at least one of the at least one backscatter devices is configured to use a low power clock during the first period and a high frequency clock during the second period.

5. The multistatic backscatter system of claim 1, wherein at least one of the at least one transmitter device comprises a combiner combining a first generated signal having a first frequency and a second generated signal having a second frequency to a two-frequency carrier signal transmitted from the transmitter device.

6. The multistatic backscatter system of claim 1, further comprising two or more transmitter devices that are configured to transmit carrier signals over an overlapping set of frequencies at time intervals that are not overlapping.

7. The multistatic backscatter system of claim 1, wherein the ranging information for a backscatter device is a ranging estimate of the backscatter device and the system further comprises at least one apparatus configured to perform a 2D localization of a backscatter device using at least three ranging estimates of the backscatter device or a 3D localization of the backscatter device using at least four ranging estimates of the backscatter device.

8. A receiver device comprising at least one processor and at least one memory storing instructions that, when executed by the at least one processor, cause the receiver device at least to:
receive signals comprising at least carrier signals and corresponding backscatter signals, which are frequency-shifted, modulated backscattered carrier signals;
split the signals received at least to a first sub-signal and a second sub-signal;
sub-channelize at least the first and second sub-signals to two or more carrier sub-channels and two or more back-scatter sub-channels to obtain at least one set of two pairs comprising a pair of carrier sub-channels and a pair of corresponding backscatter sub-channels;

determine, per a set of pairs, an occurrence time interval of an occurrence of backscatter signal in a backscatter sub-channel;

demodulate the backscatter sub-channel during the occurrence time interval to obtain data modulated to a backscatter signal;

determine from the data obtained by demodulating at least an identifier of a backscatter device; and determine, during the occurrence time interval, ranging information for the backscatter device, by determining a reference carrier phase per a carrier sub-channel in the pair of carrier sub-channels during the occurrence time interval;

estimating a modulated backscatter signal phase per a backscatter sub-channel in the pair of corresponding backscatter sub-channels during the occurrence time interval;

calculating a normalized ranging differential phase using reference carrier phases and modulated backscatter signal phases; and calculating a distance estimate for the backscatter device using the normalized ranging differential phase, wherein the distance estimate is the ranging information.

9. The receiver device of claim 8, wherein the at least one processor and the at least one memory storing instructions, when executed by the at least one processor, further cause the apparatus at least to:

receive the carrier signals and backscatter signals without synchronizing with sources of said signals.

10. The receiver device of claim 8, wherein the at least one processor and the at least one memory storing instructions, when executed by the at least one processor, further cause the apparatus at least to:

determine, per a set of two pairs, an identifier of a transmitter device of the carrier signal based on at least a frequency of a carrier sub-channel in the set.

11. The receiver device of claim 8, wherein the normalized ranging differential phase is calculated by extracting from a difference of the modulated backscatter signal phases a difference of the reference carrier phases.

12. The multistatic backscatter system of claim 1, wherein a backscatter device is a receiverless, unsynchronized device comprising at least one processor and at least one memory storing instructions that, when executed by the at least one processor, cause the receiver device at least to:

be in an idle state during a first period; and frequency-shift carrier signals, modulate data on at least some of the carrier signals, and backscatter modulated frequency-shifted carrier signals as backscatter signal during a second period, wherein the first period and the second period are alternating, the length of the first period varying randomly.

13. The multistatic backscatter system of claim 1, wherein a transmitter device comprises at least one processor and at least one memory storing instructions that, when executed by the at least one processor, cause the transmitter device at least to:

generate at least first signals having a first frequency and second signals having a second frequency;

combine at least the first signals and the second signals to multi-frequency carrier signals; and transmit the multi-frequency carrier signals towards at least one receiver device and the at least one backscatter device without synchronizing with the at least one receiver device and the at least one backscatter device.

14. A method comprising at least:

receiving signals comprising at least carrier signals and corresponding backscatter signals, which are frequency-shifted, modulated backscattered carrier signals;

splitting the signals received at least to a first sub-signal and a second sub-signal;

sub-channelizing at least the first and second sub-signals to two or more carrier sub-channels and two or more back-scatter sub-channels to obtain at least one set of two pairs comprising a pair of carrier sub-channels and a pair of corresponding backscatter sub-channels;

determining, per a set of pairs, an occurrence time interval of an occurrence of backscatter signal in a backscatter sub-channel;

demodulating the backscatter sub-channel during the occurrence time interval to obtain data modulated to a backscatter signal;

determining from the data obtained by demodulating at least an identifier of a backscatter device; and determining, during the occurrence time interval, ranging information for the backscatter device by determining a reference carrier phase per a carrier sub-channel in the pair of carrier sub-channels during the occurrence time interval, estimating a modulated backscatter signal phase per a backscatter sub-channel in the pair of corresponding backscatter sub-channels during the occurrence time interval, calculating a normalized ranging differential phase using reference carrier phases and modulated backscatter signal phases, and calculating a distance estimate for the backscatter device using the normalized ranging differential phase, wherein the distance estimate is the ranging information.

15. The method of claim 14, further comprising at least:

determining an identifier of a transmitter device of the carrier signal based on at least a frequency of a carrier sub-channel in the set of two pairs.

16. The method of claim 14, further comprising at least:

determining an identifier of a transmitter device of the carrier signal based on a frequency and a transmission time interval of a carrier sub-channel in the set of two pairs.

* * * * *